United States Patent
Ogasawara et al.

(10) Patent No.: US 12,410,733 B2
(45) Date of Patent: Sep. 9, 2025

(54) FLUID CONTROL VALVE UNIT AND VALVE TIMING CHANGE DEVICE

(71) Applicant: MIKUNI CORPORATION, Tokyo (JP)

(72) Inventors: Toshiki Ogasawara, Iwate (JP); Kouji Sugano, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 18/659,002

(22) Filed: May 9, 2024

(65) Prior Publication Data
US 2024/0392705 A1 Nov. 28, 2024

(30) Foreign Application Priority Data
May 26, 2023 (JP) .................. 2023-087049

(51) Int. Cl.
| | | |
|---|---|---|
| *F01L 1/34* | (2006.01) | |
| *F01L 1/344* | (2006.01) | |
| *F16K 11/07* | (2006.01) | |
| *F16K 31/163* | (2006.01) | |

(52) U.S. Cl.
CPC ........ *F01L 1/3442* (2013.01); *F16K 11/0716* (2013.01); *F16K 31/163* (2013.01); *F01L 2001/34433* (2013.01)

(58) Field of Classification Search
CPC . F01L 1/3442; F01L 1/047; F01L 1/46; F01L 2001/3443; F01L 2001/34423; F01L 2001/34426; F01L 2001/3444; F01L 2001/34456; F01L 2001/34469; F16K 11/0716; F16K 3/246
See application file for complete search history.

(56) References Cited

U.S. PATENT DOCUMENTS

| | | | |
|---|---|---|---|
| 2018/0135472 A1 | 5/2018 | Kajita et al. | |
| 2019/0353060 A1* | 11/2019 | Amano | .................... F15B 15/12 |
| 2020/0011214 A1* | 1/2020 | Sakaguchi | ............. F01L 1/3442 |
| 2020/0141290 A1 | 5/2020 | Asahi et al. | |
| 2022/0074323 A1 | 3/2022 | Takada | |

FOREIGN PATENT DOCUMENTS

| | | |
|---|---|---|
| DE | 102021106749 | 10/2021 |
| DE | 102022103742 | 10/2022 |
| JP | 2015124643 | 7/2015 |
| JP | 2017122418 | 7/2017 |

* cited by examiner

*Primary Examiner* — Kelsey E Cary
(74) *Attorney, Agent, or Firm* — JCIPRNET

(57) ABSTRACT

A fluid control valve unit includes: a fluid control valve V, including: an inlet 74; a communication port 75, 76; a sleeve 70 having a bottom end 70*a* and an opening end 70*b* and defining an axis S; and a spool 80 disposed in the sleeve to open and close the communication port; a cylindrical passage member 50, having: an inner circumferential surface 51, fit with the sleeve; a passage; an annular receiving part 53; and an opening part 52; a filter 60; and a stopper 110, receiving the opening end 70*b* of the sleeve 70 accommodated in the passage member 50. The filter 60 is integrally formed by a metal plate spring member to include an annular plate part 61, a filter part 62 surrounded by the annular plate part, and a plate spring piece extending from the annular plate part.

18 Claims, 30 Drawing Sheets

FLUID CONTROL VALVE UNIT AND VALVE TIMING CHANGE DEVICE

CROSS-REFERENCE TO RELATED APPLICATIONS

This application claims the priority benefit of Japan Application No. 2023-087049, filed on May 26, 2023. The entirety of the above-mentioned patent application is hereby incorporated by reference herein and made a part of this specification.

BACKGROUND

Technical Field

The invention relates to a fluid control valve unit and a valve timing change device of an internal combustion engine using the fluid control valve unit.

Description of Related Art

As a conventional fluid control valve unit, a hydraulic pressure control valve including the following is known: a valve body, having an insertion hole with an axis as the center; a bottomed cylindrical sleeve, closely inserted into the valve body; a spool valve body, slidably disposed in the sleeve; a valve spring, disposed in the sleeve to bias the spool valve body in an axis direction; a check valve, disposed between a tip end (bottom wall) of the valve body and an end (bottom end) of the sleeve; a fixing member, abutting against the other end (opening end) of the sleeve; and an elastic member (a seal member forming an O-ring) disposed between the check valve and the bottom wall of the valve body (see, for example, Patent Document 1).

In the hydraulic control valve, the check valve includes a cylindrical body part, a ball valve body movably disposed in the body part in the axis direction, a coil spring biasing the ball valve body in a valve closing direction, and a filter caulked and fixed to the body part. In addition, in the sleeve, an end in the axis direction is held by an elastic member (seal member) disposed between a tip end (bottom wall) of the valve body and a body part of the check valve, and the other end in the axis direction is held by the fixing member having an annular shape and pressed against the inner wall surface of the valve body.

Here, the seal member applying a biasing force to the end of the sleeve has a structure applying the biasing force via the body part of the check valve, and the filter has a structure of being fixed to the body part by caulking. Therefore, the number of components is large, the structure is complex, and the assembling process is complicated. In addition, the fixing member holding the other end of the sleeve is fixed by being pressed against the inner wall surface of the valve body. Therefore, due to the impact or changes over time, etc., resulting from the reciprocation of the spool valve body, the fixing member may fall off.

In addition, as another fluid control valve unit, a control valve including the following is known: a linking bolt, having an insertion hole with an axis as the center; a spool and retainer, accommodated in the linking bolt; a spool spring, disposed between a spool and the retainer; and a check valve, connected to the retainer by sandwiching an O-ring, the check valve including a ball holder, a conical oil filter provided at the ball holder, a check ball, and a check spring (see, for example, Patent Document 2).

In the control valve, the shapes of the ball holder and the oil filter are complicated, and the O-ring is adopted as an elastic member applying a biasing force in the axis direction. Therefore, the number of components is large, the structure is complex, and the assembling process is complicated.

Prior Art Document(s)

Patent Document(s)

[Patent Document 1] Japanese Laid-open No. 2015-124643.
[Patent Document 2] Japanese Laid-open No. 2017-122418.

The invention provides a fluid control valve unit with which the structure can be simplified, the number of components can be reduced, the cost can be reduced, the assembling process can be simplified, a foreign matter can be prevented from entering, and a sleeve can be held at a predetermined position to ensure functional reliability, as well as a valve timing change device using the fluid control valve unit.

SUMMARY

A fluid control valve unit according to an aspect of the invention includes: a sleeve, having a bottomed cylindrical shape, having: a fluid control valve, including: an inlet; a communication port in communication with outside; a bottom end; and an opening end, and defining an axis; and a spool slidably disposed in the sleeve to open and close the communication port; a passage member, having a cylindrical shape and provided with: an inner circumferential surface, fit with the sleeve; a passage of a fluid, leading to the communication port; an annular receiving part, facing the bottom end in a direction of the axis; and an opening part formed in adjacency with the annular receiving part and allowing the fluid to flow in; a filter, disposed between the bottom end and the annular receiving part; and a stopper, receiving the opening end of the sleeve accommodated in the passage member. The filter is integrally formed by a metal plate spring member to include an annular plate part, a filter part surrounded by the annular plate part, and a plate spring piece extending from the annular plate part and applying a biasing force in the direction of the axis.

DESCRIPTION OF THE EMBODIMENTS

Figure 1:
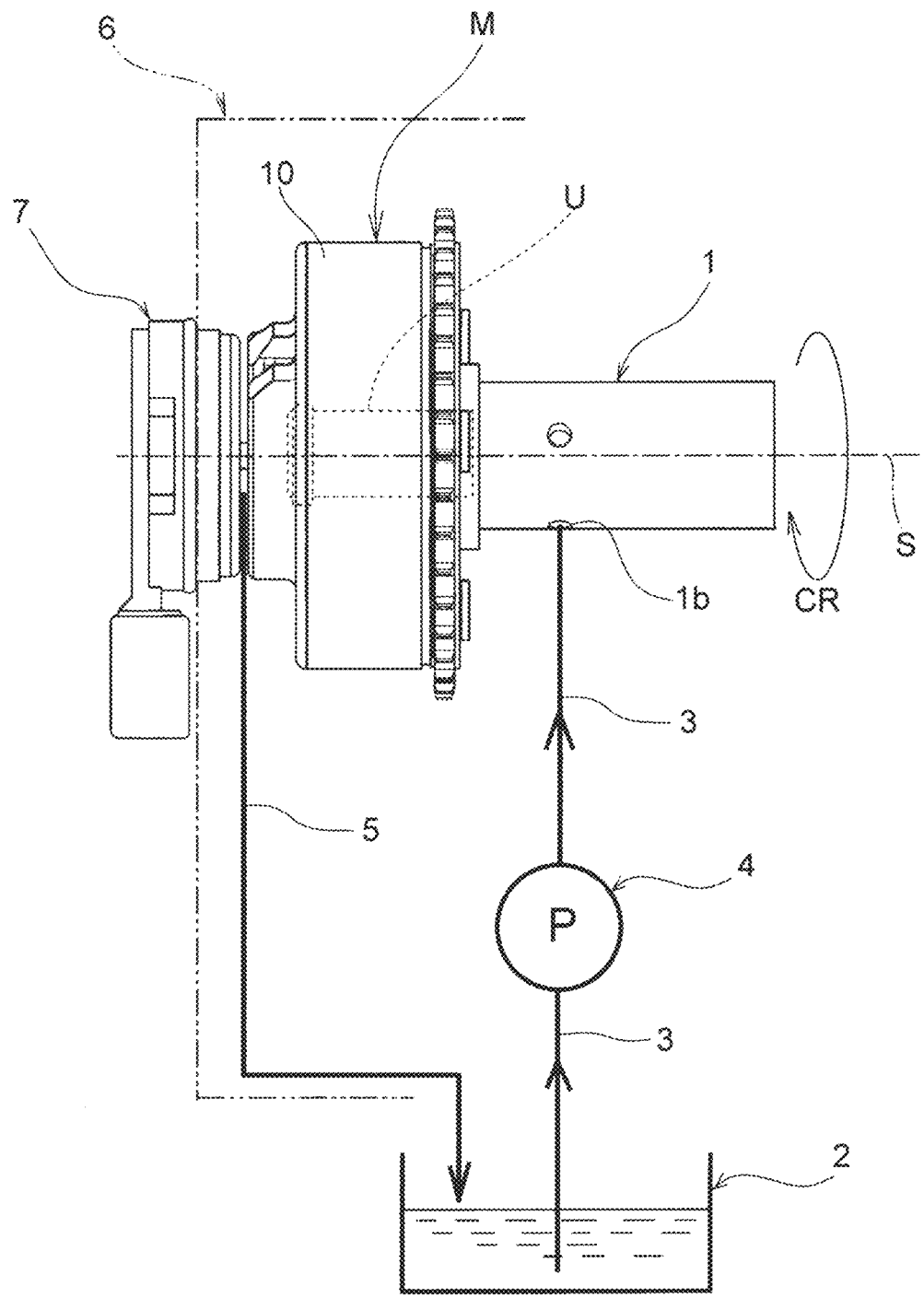
FIG. 1 is a schematic view illustrating a configuration of an engine to which a valve timing change device is applied, the valve timing change device including a fluid control valve unit according to an embodiment.
Figure 2:
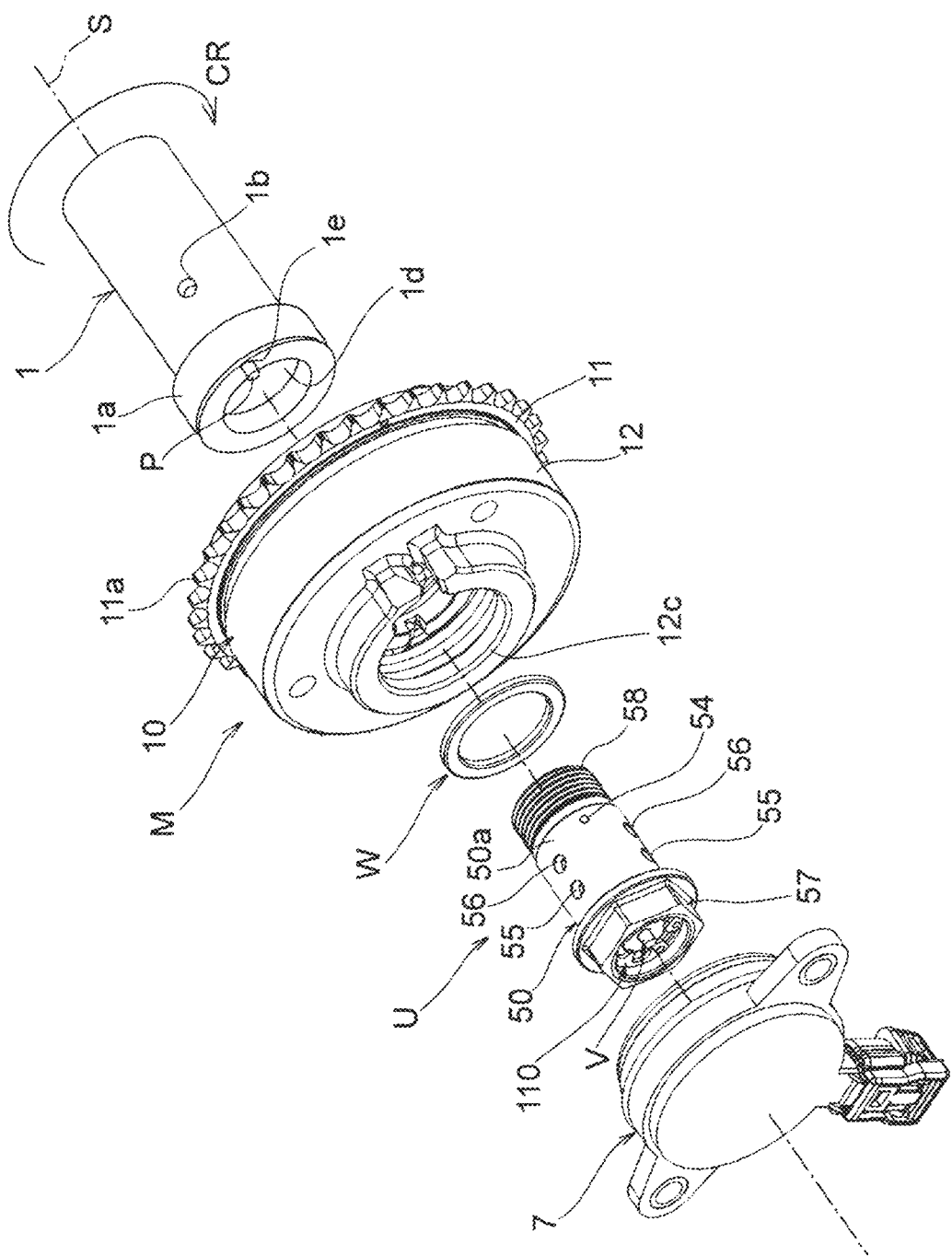
FIG. 2 is an exploded perspective view, when viewed from the oblique front of a side opposite to a camshaft, illustrating an electromagnetic actuator, a fastening bolt in which a fluid control valve is built, the valve timing change device, and the camshaft in the configuration shown in FIG. 1.

A fluid control valve unit according to an aspect of the invention includes: a fluid control valve, including: an inlet; a communication port in communication with outside; a sleeve having a bottomed cylindrical shape having a bottom end and an opening end and defining an axis; and a spool slidably disposed in the sleeve to open and close the communication port; a passage member, having a cylindrical shape and provided with: an inner circumferential surface, fit with the sleeve; a passage of a fluid, leading to the communication port; an annular receiving part, facing the bottom end in a direction of the axis; and an opening part formed in adjacency with the annular receiving part and allowing the fluid to flow in; a filter, disposed between the bottom end and the annular receiving part; and a stopper, receiving the opening end of the sleeve accommodated in the passage member. The filter is integrally formed by a metal plate spring member to include an annular plate part, a filter part surrounded by the annular plate part, and a plate spring piece extending from the annular plate part and applying a biasing force in the direction of the axis.

In the fluid control valve unit, it may also be configured that the passage member has an annular groove adjacent to the opening end in the direction of the axis and recessed with respect to the inner circumferential surface, and the stopper is a snap ring fit into the annular groove to detachably receive the spool.

In the fluid control valve unit, it may also be configured that the filter is disposed so that the annular plate part abuts against the annular receiving part, and the plate spring piece abuts against the bottom end.

In the fluid control valve unit, it may also be configured that the filter includes multiple micro pores formed through an etching process.

In the fluid control valve unit, it may also be configured that the plate spring piece is formed to extend from an outer edge of the annular plate part and be bent.

In the fluid control valve unit, it may also be configured that the sleeve includes, in a region of the bottom end, a cutout passage formed on an outer wall to supply the fluid passing through the filter to the inlet; and an abutting part abutting against the plate spring piece of the filter.

In the fluid control valve unit, it may also be configured that the cutout passage includes a first cutout passage and a second cutout passage formed as separated from each other about the axis, the abutting part includes: a narrow abutting part located between the first cutout passage and the second cutout passage; and a wide abutting part away from the cutout passage, and the plate spring piece includes a first plate spring piece, a second plate spring piece, and a third plate spring piece disposed at equal intervals in a circumferential direction of the annular plate part.

In the fluid control valve unit, it may also be configured that the first plate spring piece includes a pair of clamping pieces abutting against the narrow abutting part and sandwiching the narrow abutting part.

In the fluid control valve unit, it may also be configured that the fluid control valve includes a check valve disposed on an inner side of the sleeve to allow the fluid to flow in from the inlet.

In the fluid control valve unit, it may also be configured that the snap ring has a discharge port able to discharge the fluid flowing through a discharge passage formed in the passage member.

In the fluid control valve unit, it may also be configured that the snap ring is formed in a plate shape expanding in a direction perpendicular to the axis.

In the fluid control valve unit, it may also be configured that the sleeve includes, as the communication port, a first communication port and a second communication port located on two sides sandwiching the inlet in the direction of the axis, and the spool includes: a rod, reciprocating in the sleeve; a first valve part, provided at the rod to open and close a passage between the inlet and the first communication port; a second valve part, provided at the rod to open and close a passage between the inlet and the second communication port; and a biasing spring, applying a biasing force in a direction that brings the first valve part to abut against the snap ring.

In the fluid control valve unit, it may also be configured that the spool includes a compression spring disposed between the first valve part and the second valve part, the first valve part includes: a first fixed part, having a first land able to block the first communication port and a first inner passage formed on an inner side of the first land, and being fixed to the rod; and a first movable part, having a first cover part opening and closing the first inner passage and movably supported along the rod, a second fixed part, having a second land able to block the second communication port and a second inner passage formed on an inner side of the second land, and being fixed to the rod; and a second movable part, having a second cover part opening and closing the second inner passage and movably supported along the rod, and the compression spring is disposed to apply a biasing force to close the first cover part and close the second cover part.

A valve timing change device according another aspect of the invention is a valve timing change device changing an opening/closing timing of an intake air valve or an exhaust air valve driven by a camshaft. The valve timing change device comprising: a housing rotor, rotating coaxially with the camshaft; a vane rotor, cooperating with the housing rotor to define an advance chamber and a retard chamber and integrally rotating with the camshaft; the fluid control valve unit, forming a configuration in which the sleeve includes the inlet, the first communication port, and the second communication port, and the spool includes the first valve part and the second valve part, and configured to control supplying and discharging of hydraulic oil with respect to the advance chamber and the retard chamber. The inlet of the fluid control valve unit is a supply port to which the hydraulic oil is supplied. The first communication port of the fluid control valve unit is a retard port in communication with the retard chamber. The second communication port of the fluid control valve unit is an advance port in communication with the advance chamber. In the valve timing change device, it may also be configured that the valve timing change device includes: a fastening bolt fastening the vane rotor to the camshaft, and the fastening bolt serves as the passage member of the fluid control valve unit.

In the valve timing change device, it may also be configured that the fluid control valve of the fluid control valve unit is a torque-driven and hydraulic pressure-driven type fluid control valve reciprocating the hydraulic oil between the retard chamber and the advance chamber by using a variable torque received by the camshaft and being able to discharge a portion of the hydraulic oil that is supplied.

In the valve timing change device, it may also be configured that in a state of being positioned in a retard mode in which the first valve part is opened and the second valve part is closed, when the camshaft receives a reverse torque, the second valve part is opened to allow a flow of the hydraulic oil from the advance port toward the retard port, and in a state of being positioned in an advance mode in which the first valve part is closed and the second valve part is opened, when the camshaft receives a forward torque, the first valve part is opened to allow a flow of the hydraulic oil from the retard port toward the advance port.

In the valve timing change device, it may also be configured that in a state of being positioned in a neutral hold mode in which the first valve part blocks the retard port and the second valve part blocks the advance port, reciprocation of the hydraulic oil between the retard chamber and the advance chamber is cut off.

According to the fluid control valve unit with the above configuration, the structure can be simplified, the number of components can be reduced, the cost can be reduced, and the assembling process can be simplified, and a foreign matter can be prevented from entering, and the sleeve can be held at a predetermined position to ensure functional reliability. In addition, according to the valve timing change device including the fluid control valve unit with the above configuration, the device size can be reduced, the sleeve can be held at a predetermined position to ensure reliability, and the desired operation can be attained.

In the following, the embodiments of the invention will be described with reference to the accompanying drawings.

As shown in FIG. 1, a valve timing change device M including a fluid control valve unit U according to an embodiment is installed to a camshaft 1 of an internal combustion engine, and changes an opening/closing period of an intake air valve or an exhaust air valve driven by the camshaft 1. That is, the valve timing change device M changes a valve timing.

The internal combustion engine includes: the camshaft 1, driving to open/close the intake air valve or the exhaust air valve; an oil pan 2, storing hydraulic oil; a supply passage 3, supplying the hydraulic oil as a fluid in the oil pan 2 toward the camshaft 1; an oil pump 4, provided midway of the supply passage 3, and attracting, pressurizing, and discharging the hydraulic oil; a discharge passage 5, bringing the hydraulic oil discharged from a fluid control unit U back to the oil pan 2; a chain cover 6, covering the valve timing change device M; and an electromagnetic actuator 7, fixed to the chain cover 6.

As shown in FIGS. 1 to 7, the camshaft 1 rotates in a direction CR with an axis S as the center, and includes a fitting shaft part 1a, passages 1b and 1c, a female screw part 1d, and a fitting hole 1e to be fit with a positioning pin P.

The supply passage 3 is formed in a cylinder block and a cylinder head, etc., of the internal combustion engine.

The discharge passage 5 is defined between the cylinder block as well as the cylinder head and the chain cover 6 of the internal combustion engine, and brings extra hydraulic oil discharged from the fluid control unit U back to the oil pan 2.

Figure 3:
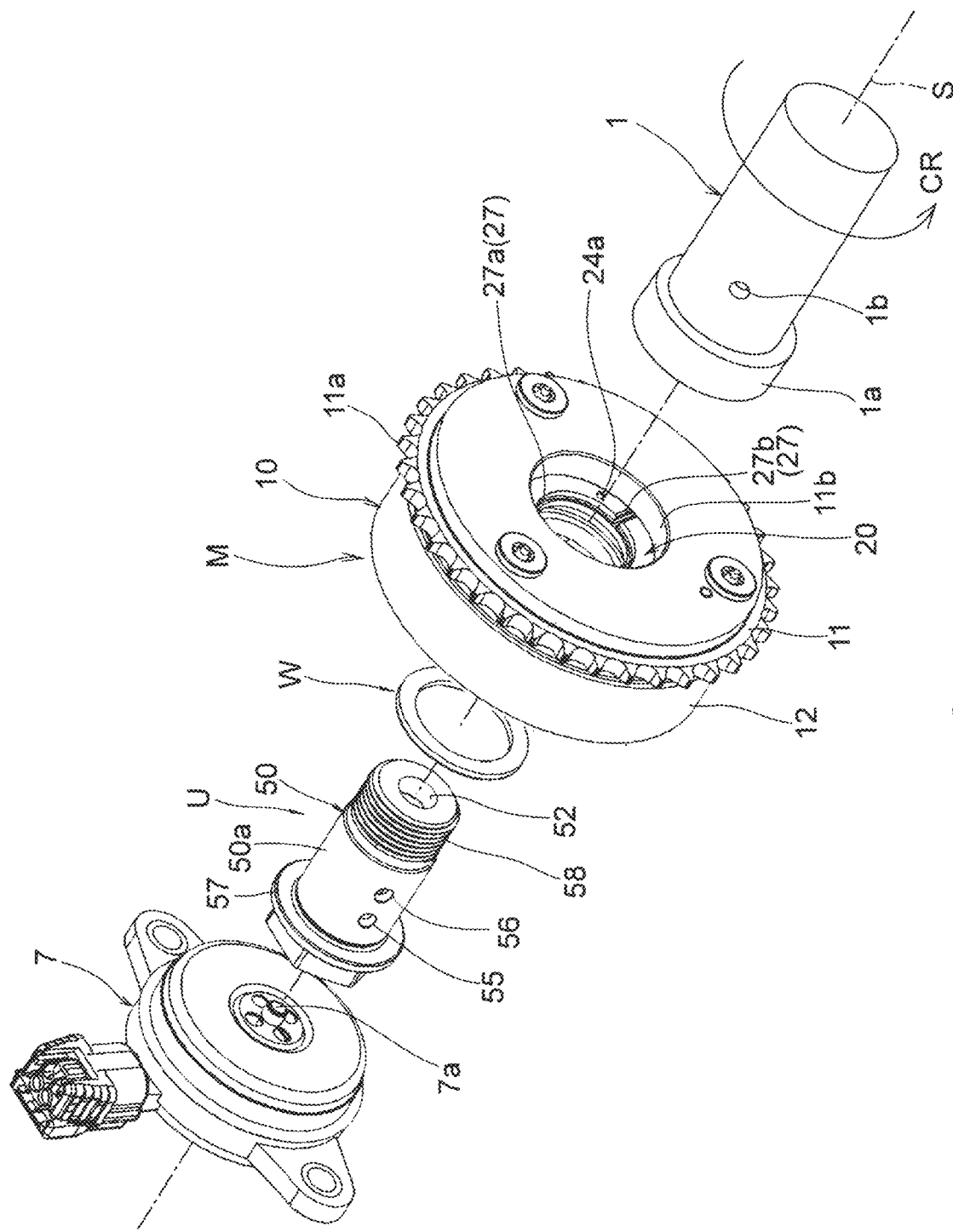
FIG. 3 is an exploded perspective view, when viewed from the oblique rear of a side of the camshaft, illustrating the electromagnetic actuator, the fastening bolt in which the fluid control valve is built, the valve timing change device, and the camshaft in the configuration shown in FIG. 1.
Figure 4:
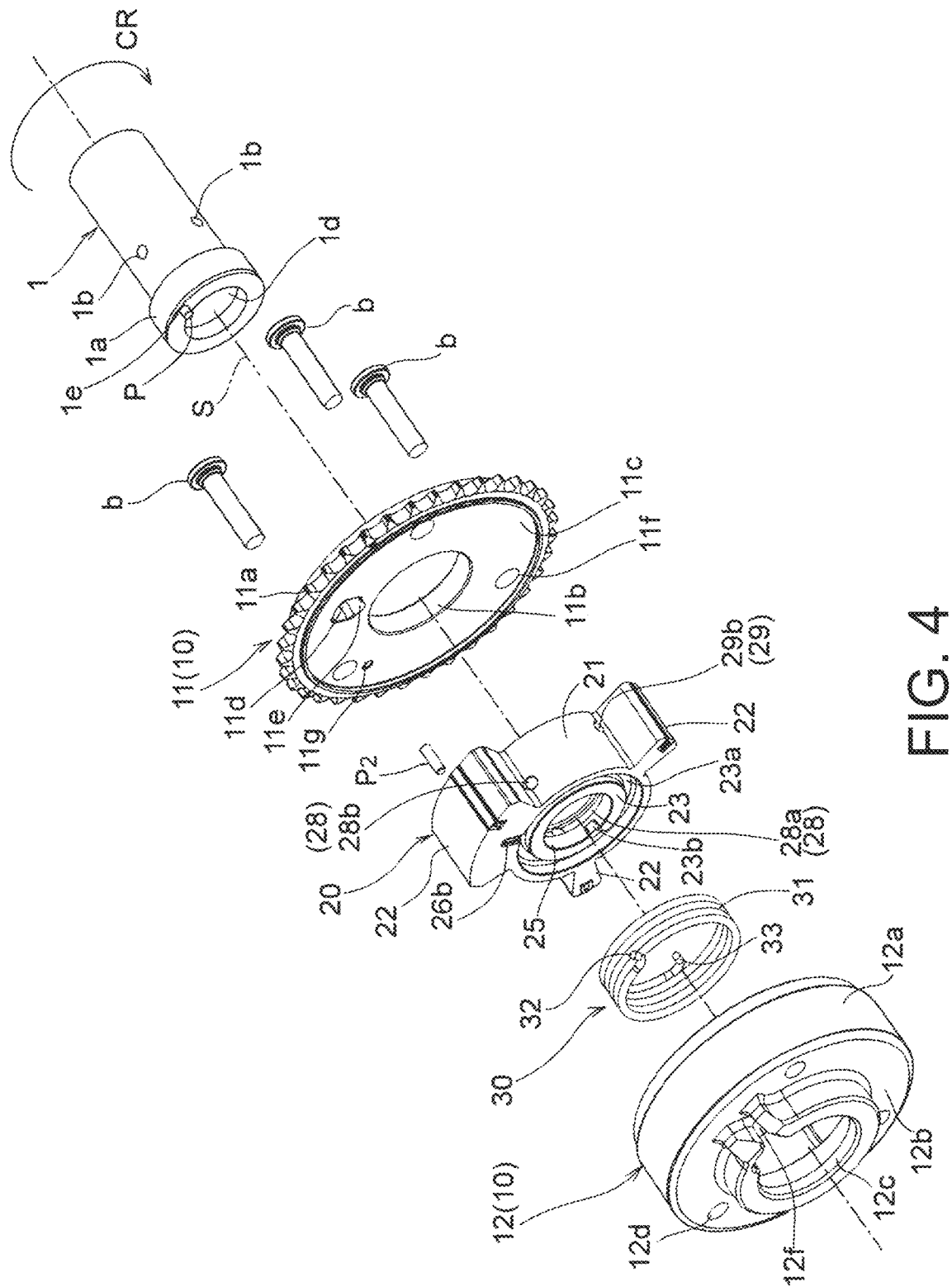
FIG. 4 is an exploded perspective view, when viewed from the oblique front of the side opposite to the camshaft, illustrating a housing rotor, a vane rotor, a rotation biasing spring, and the camshaft included in the valve timing change device according to the invention.

The electromagnetic actuator 7 is fixed to the chain cover 6 and, as shown in FIG. 3, includes a driving shaft 7a moving in the direction of the axis and an excitation coil (not shown) driving the driving shaft 7a.

As shown in FIGS. 2 to 7, the valve timing change device M includes a housing rotor 10, a vane rotor 20, a rotation biasing spring 30, a lock mechanism 40, and the fluid control valve unit U.

The fluid control valve unit U includes a fastening bolt 50 as a passage member, a filter 60, a fluid control valve V, and a snap ring 110 as a stopper.

The fluid control valve V serves to switch the passage to control the flow of the hydraulic oil, and includes a sleeve 70, a spool 80, a biasing spring 90, and a check valve 100.

The housing rotor 10 is rotatably supported on the axis S of the camshaft 1 and linked with the rotation of a crankshaft via a chain, and transmits a rotational driving force of a crankshaft to camshaft 1 via the vane rotor 20.

As shown in FIGS. 4 to 7, the housing rotor 10 has a two-part structure formed by a first housing 11 having a disk shape and a second housing 12 having a bottomed cylindrical shape and combined with the first housing 11. In addition, the housing rotor 10 accommodates the vane rotor 20 to be relatively rotatable within an angle range between the most retard position and the most advance position of the vane rotor 20, and cooperates with the vane rotor 20 to define an advance chamber AC and a retard angle chamber RC.

The first housing 11 includes a sprocket 11a, a fitting hole 11b, an inner wall surface 11c, a lock hole 11d, a concave part 11e formed continuously with the lock hole 11d, three circular holes 11f through which screws b pass, and a positioning hole 11g fit with a positioning pin $P_2$. The fitting hole 11b is rotatably fit with a fitting shaft part 1a of the camshaft 1. The inner wall surface 11c slidably contacts a back surface 24 of the vane rotor 20. A lock pin 41 of the lock mechanism 40 fits into the lock hole 11d with a small gap. The concave part 11e is formed on the circumference of the lock hole 11d to guide the hydraulic oil to a tip pressure-receiving part 41a of the lock pin 41 fit into the lock hole 11d.

As shown in FIGS. 4 to 7, the second housing 12 includes a cylindrical wall 12a, a front wall 12d, an opening part 12c, three screw holes 12d into which the screws b are screwed, three shoe parts 12e, a hooking groove 12f, a concave part 12g, an annular bonding part 12h bonded to the inner wall surface 11c of the first housing 11, and a positioning hole 12i into which the positioning pin $P_2$ is fit.

The opening part 12c forms a circular hole with the axis S as the center, so that the fastening bolt 50 passes through.

On the inner side of the front wall 12b, the three shoe parts 12e protrude from the cylindrical wall 12a toward the center, and are formed by being disposed at equal intervals in the circumferential direction.

One of the shoe parts 12e abuts against a vane part 22 of the vane rotor 20 to define a maximum retard position, and another one of the shoe parts 12e abuts against the vane part 22 to define a maximum advance position.

The hooking groove 12f is formed by cutting out a part of the opening 12c to lock a first end 32 of the rotation biasing spring 30. The concave part 12g accommodates a portion of the coil part 31 of the rotation biasing spring 30.

The vane rotor 20 is disposed on the inner side of the housing rotor 10, cooperates with the housing rotor 10 to define the advance chamber AC and the retard chamber RC, is fixed to the camshaft 1 by the fastening bolt 50 by sandwiching a washer W, and integrally rotates with the camshaft 1.

As shown in FIGS. 4 to 7, the vane rotor 20 includes a hub part 21, three vane parts 22, a front surface 23, an annular concave part 23a, a hooking groove 23b, a back surface 24, a fitting hole 25, a concave part 26, a communication path 27, a retard passage 28, and an advance passage 29.

The vane parts 22 cooperate with the shoe parts 12e of the housing rotor 10 to define the advance chamber AC and the retard chamber RC. The front surface 23 is slidably disposed on and brought into contact with the inner wall surface of the front wall 12b of the second housing 12. The annular concave part 23a is formed to cut out the front surface in an annular shape to accommodate a portion of the coil part 31 of the rotation biasing spring 30. The hooking groove 23b is formed by cutting out a portion of the front surface 23, so as to hook a second end 33 of the rotation biasing spring 30.

The back surface 24 is formed on a plane perpendicular to the axis S, bonded to the end surface of the camshaft 1, and is slidably disposed on and brought into contact with the inner wall surface 11c of the first housing 11. In addition, on the back surface 24, a fitting hole 24a into which the positioning pin P is fit is provided. The positioning pin P is to be installed to the fitting hole 1e of the camshaft 1. The fitting hole 25 is formed with an inner diameter dimension with which a cylindrical part 50a of the fastening bolt 50 is fit closely.

Figure 5:
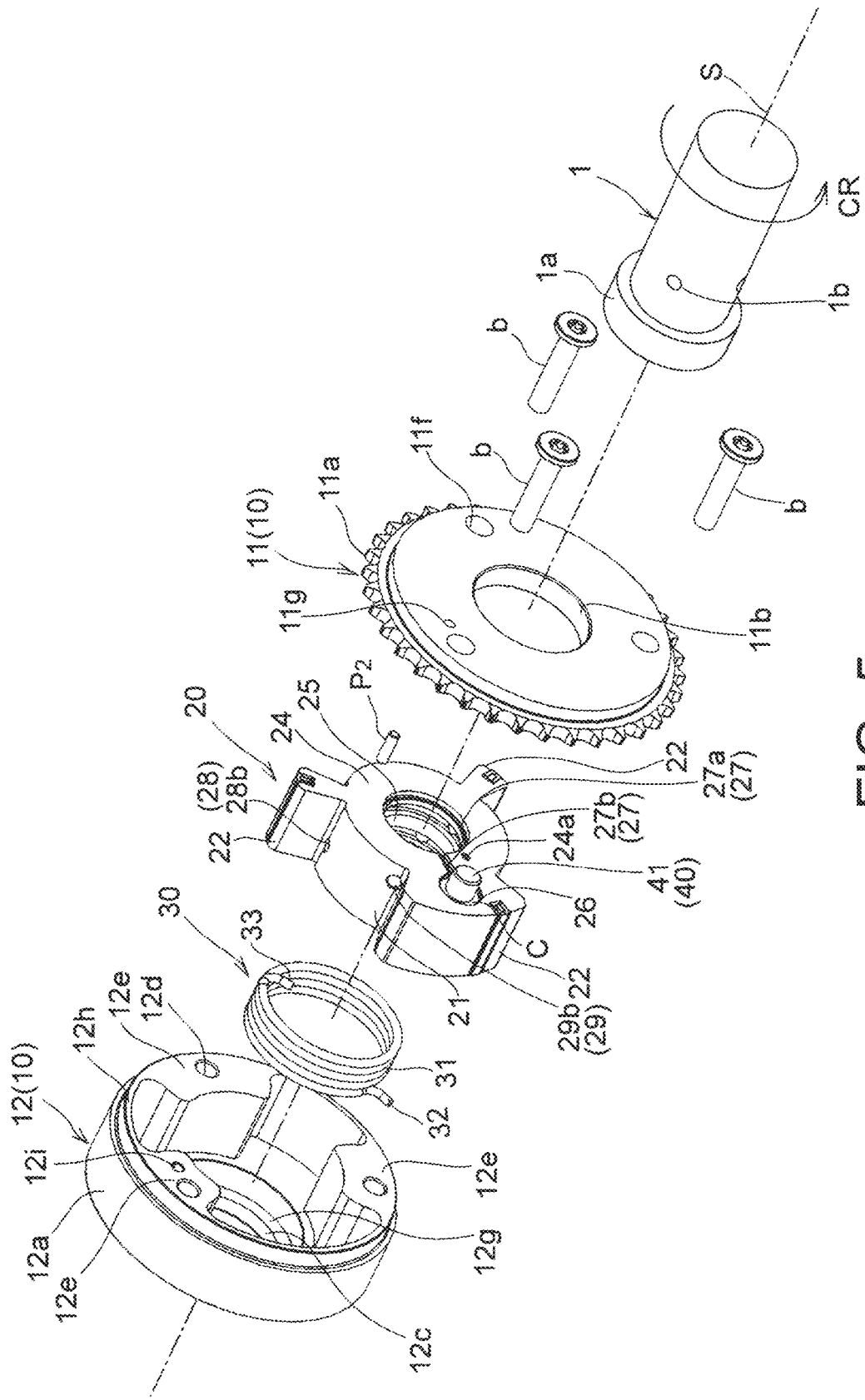
FIG. 5 is an exploded perspective view, when viewed from the oblique rear on the side of the camshaft, illustrating the housing rotor, the vane rotor, the rotation biasing spring, and the camshaft included in the valve timing change device according to the invention.
Figure 6:
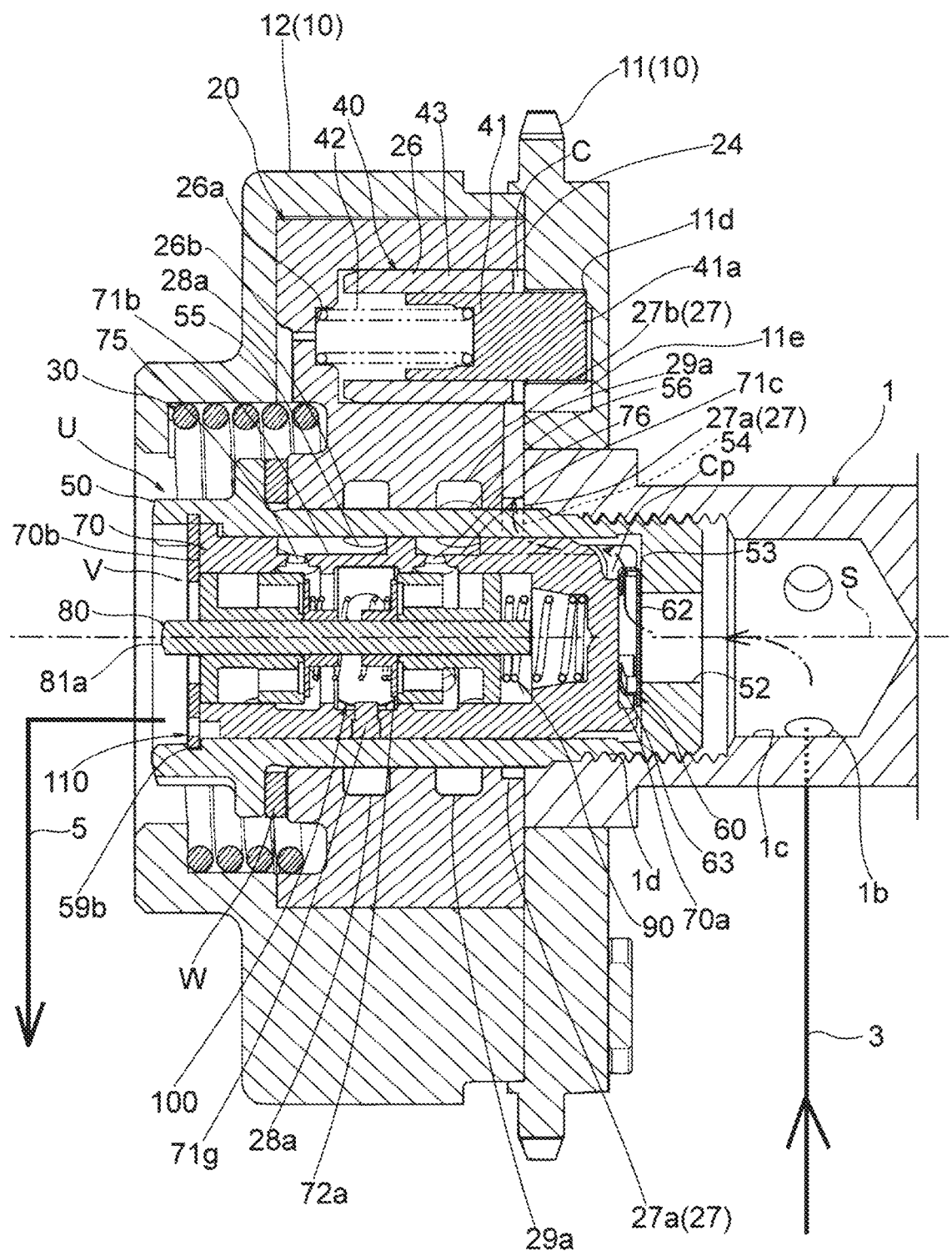
FIG. 6 is a cross-sectional view illustrating a locked state in which a lock mechanism is operated in a state in which the valve timing change device of the invention is fastened and fixed to the camshaft by using a fastening bolt.
Figure 7:
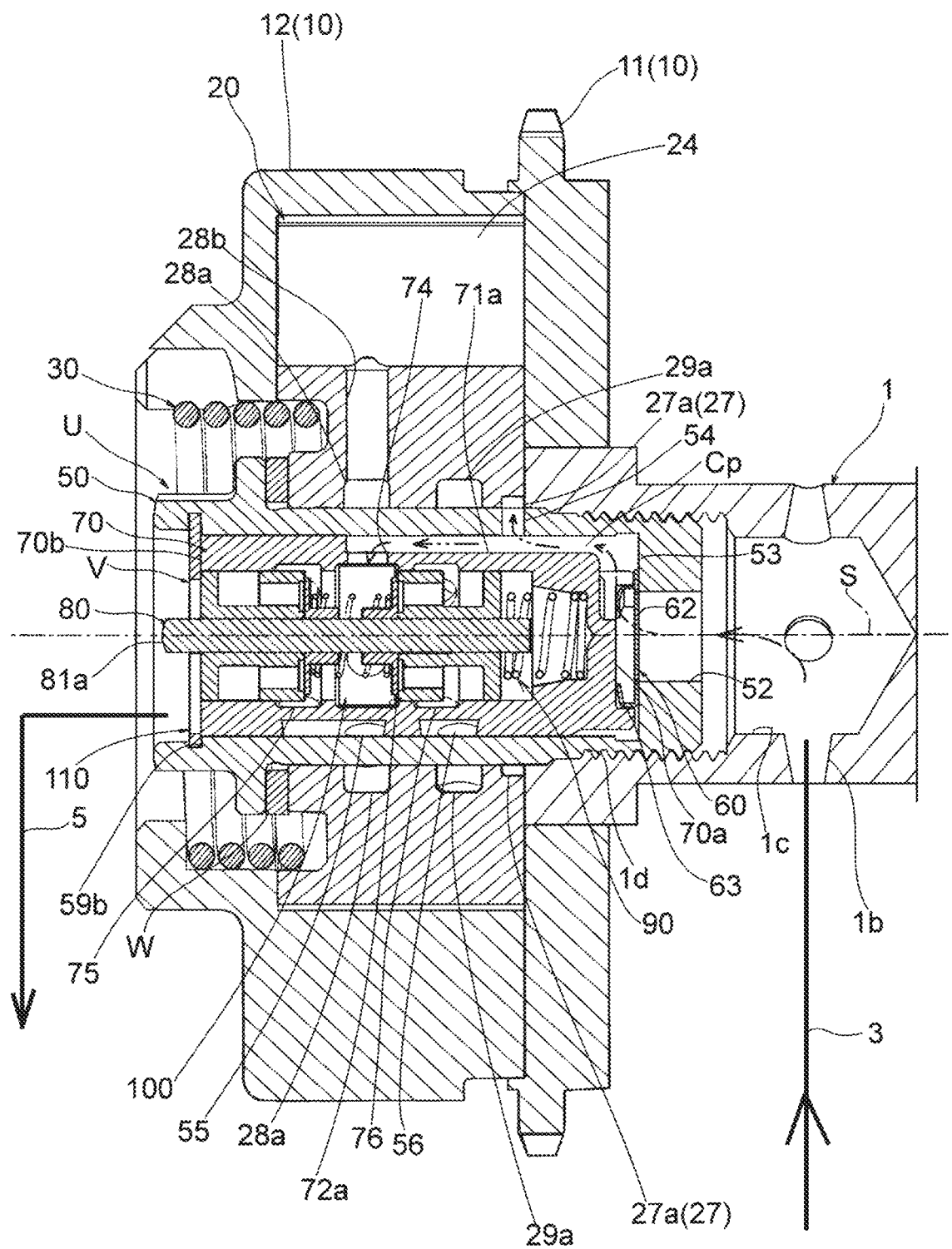
FIG. 7 is a cross-sectional view illustrating a passage of a region around the fluid control valve unit in the state in which the valve timing change device of the invention is fastened and fixed to the camshaft by using the fastening bolt.

As shown in FIGS. 5 and 6, the concave part 26 is formed to accommodate the lock mechanism 40 in one of the vane parts 22, and includes a receiving part 26a and a communication path 26b. The receiving part 26a receives the biasing spring 42 included in the lock mechanism 40. The communication path 26b is in communication with the outside of the vane rotor 20.

The communication path 27 is formed by an annular communication path 27a and a linear communication path 27b, and cooperates with the end surface of the camshaft 1 and the inner wall surface 11c of the housing rotor 10 to supply the hydraulic oil toward the lock mechanism 40 and discharge the hydraulic oil from the lock mechanism 40. That is, the communication path 27 serves to, with respect to the lock mechanism 40, supply the hydraulic oil guided through a through path 54 of the fastening bolt 50 on the side upstream of the fluid control valve V in the flowing direction of the supplied hydraulic oil to release locking, and serves to discharge the hydraulic oil at the time of locking. Since the communication path 27 is formed on the back surface 24 of the vane rotor 20, processing is easy to perform, and a lubrication effect is provided in the sliding region of the inner wall surface 11c.

Figure 22:
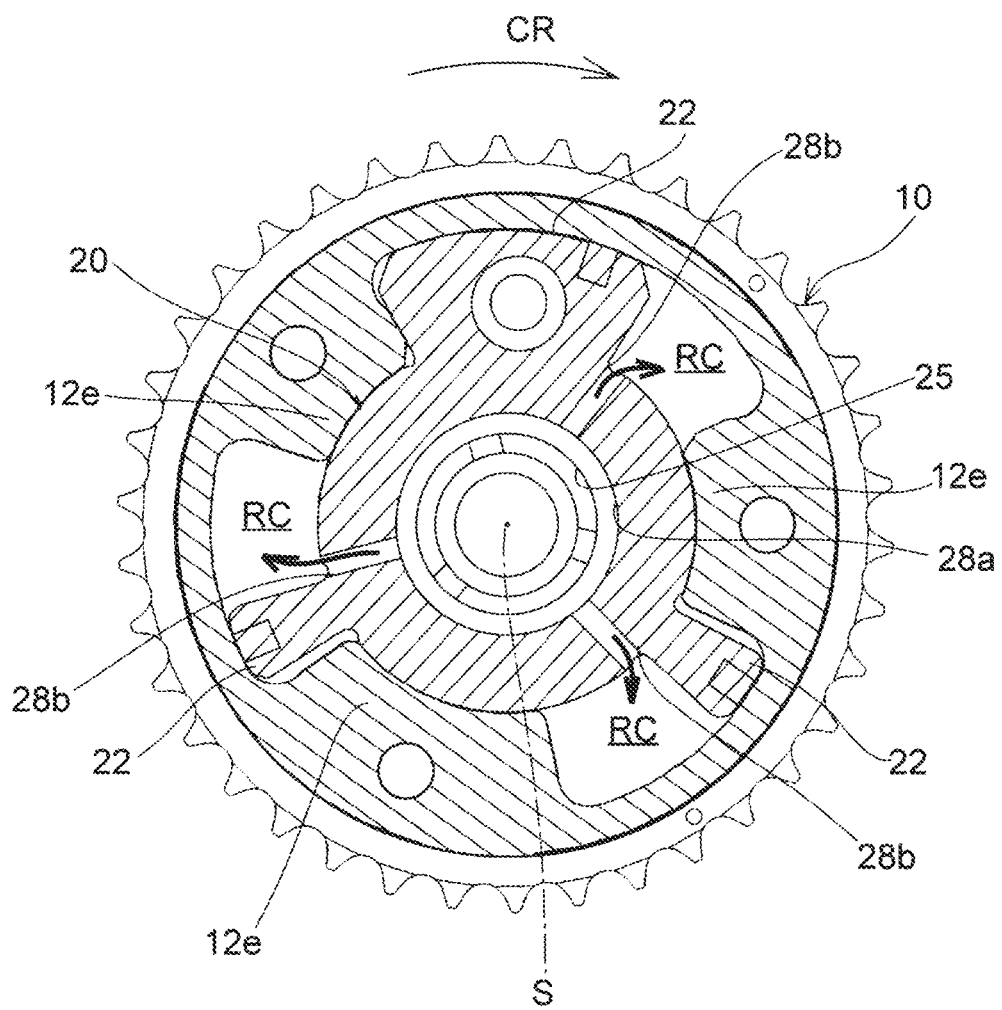
FIG. 22 is a cross-sectional view illustrating a state in which the vane rotor is located at a most retard position with respect to the housing rotor.

The retard passage 28 supplies and discharges hydraulic oil with respect to the retard chamber RC. As shown in FIG. 22, the retard passage 28 is formed by an annular groove 28a formed on the inner circumferential surface of the fitting hole 25, and a through path 28b radially penetrating through the hub part 21 from the annular groove 28a.

Figure 23:
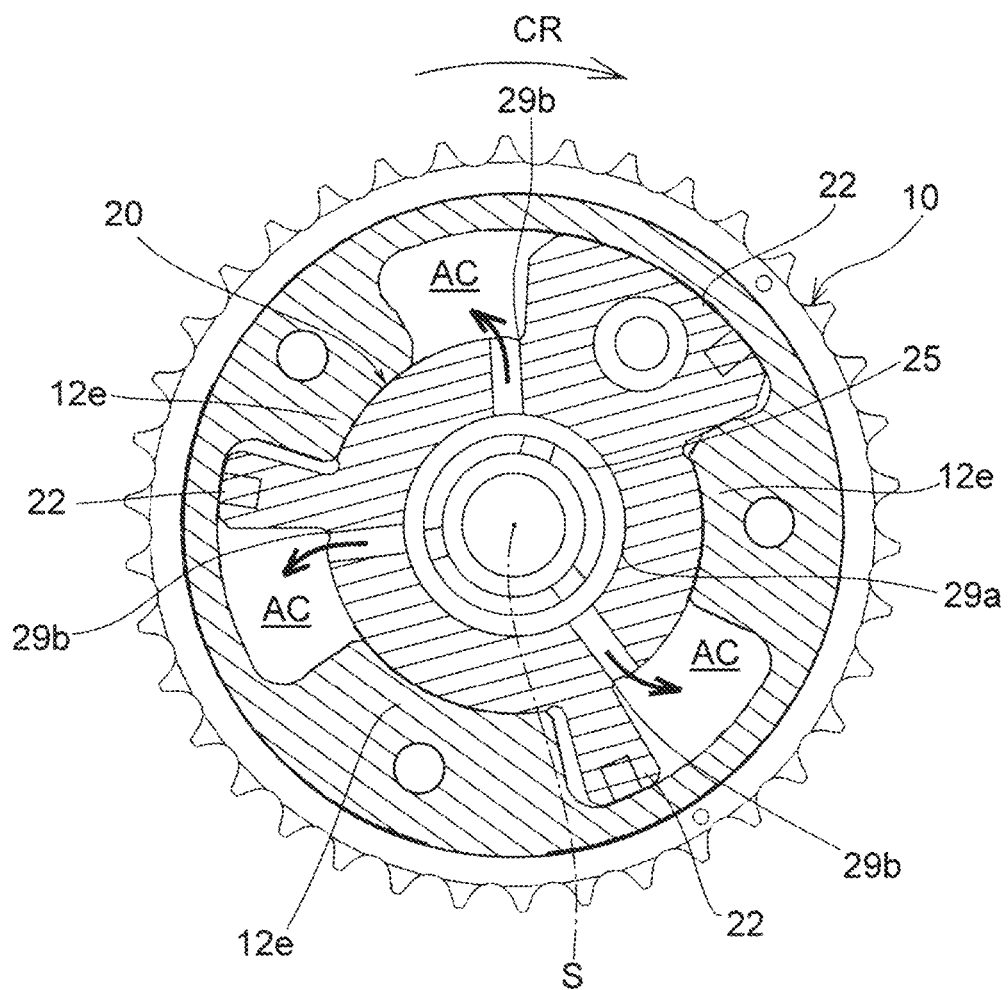
FIG. 23 is a cross-sectional view illustrating a state in which the vane rotor is located at a most advance position with respect to the housing rotor.

The advance passage 29 supplies and discharges hydraulic oil with respect to the advance chamber AC. As shown in FIG. 23, the advance passage 29 is formed by an annular groove 29a formed on the inner circumferential surface of the fitting hole 25, and a through path 29b radially penetrating through the hub part 21 from the annular groove 29a.

As shown in FIGS. 4 to 7, the rotation biasing spring 30 is a coil spring having a coil part 31, a first end 32, and a second end 33.

In addition, in the rotation biasing spring 30, the coil part 31 is accommodated in the annular concave part 23a of the vane rotor 20 and the concave part 12g of the housing rotor 10, the first end 32 is hooked to the hook groove 12f of the housing rotor 10, and the second end 33 is hooked to the hook groove 23b of the vane rotor 20. Accordingly, the rotation biasing spring 30 rotationally biases the vane rotor 20 in the advance direction with respect to the housing rotor 10.

In this way, by adopting the rotation biasing spring 30 biasing in the advance direction, the responsiveness can be facilitated by assisting an operation torque at the time of advancing. By setting the load of the rotation biasing spring 30 so that the difference between the operation torque and the load torque is substantially equal at the time of advancing and retarding, the controllability can be facilitated.

Figure 21:
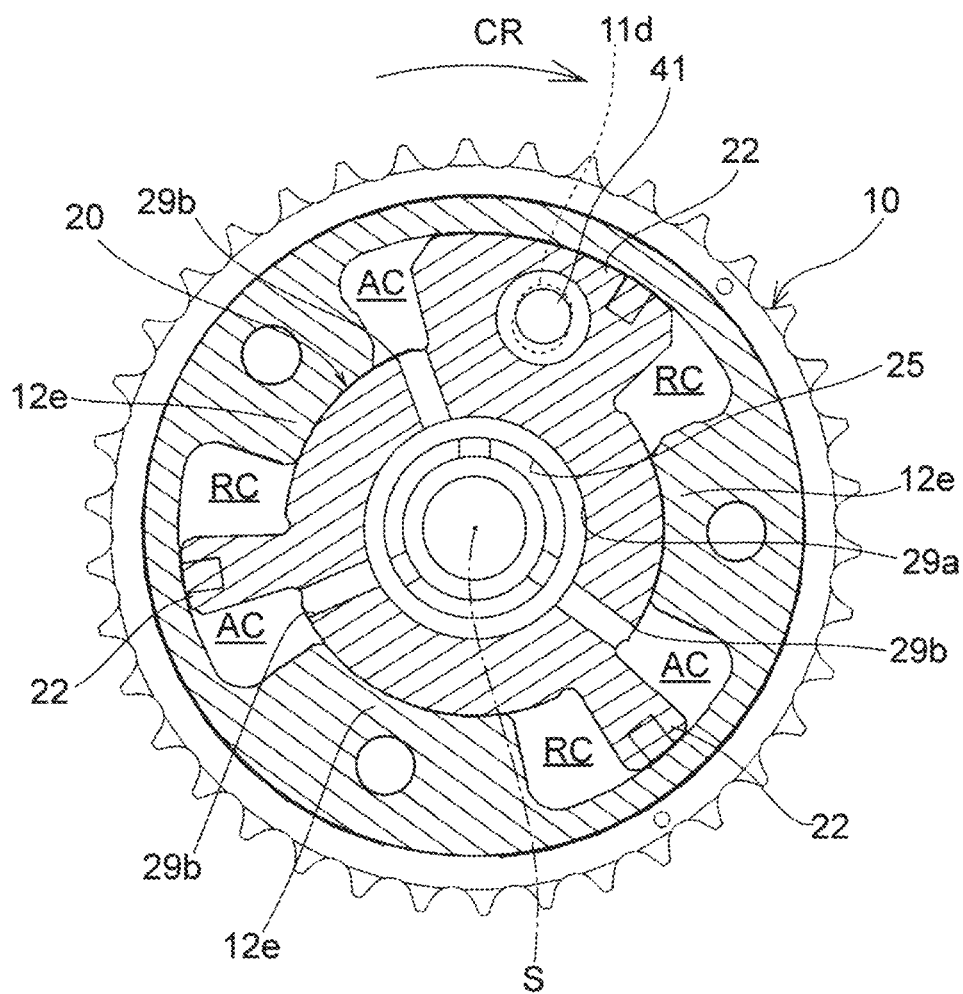
FIG. 21 is a cross-sectional view illustrating a state in which the vane rotor is locked at an intermediate position with respect to the housing rotor.

As shown in FIG. 6, the lock mechanism 40 includes the lock pin 41, the biasing spring 42, and a cylindrical holder 43. In addition, as shown in FIG. 21, the lock mechanism 40 locks the vane rotor 20 at an intermediate position between the most retard position and the most advance position with respect to the housing rotor 10.

The lock pin 41 forms a substantially cylindrically columnar part, and has the tip pressure-receiving part 41a. In addition, the lock pin 41 is retractably held in the direction of the axis S with respect to the back surface 24 of the vane rotor 20, so as to be fittable into the lock hole 11d of the housing rotor 10. The biasing spring 42 biases the lock pin 41 in a protruding direction. The cylindrical holder 43 is fit and fixed to the concave part 26 of the vane rotor 20, so as to reciprocally hold the lock pin 41 biased by the biasing spring 42. In addition, as shown in FIGS. and 6, the cylindrical holder 43 is disposed to be immersed from the back surface 24 of the vane rotor 20, so as to define an annular oil reservoir C in communication with the linear communication path 27b on the circumference of the lock pin 41. By providing the annular oil reservoir C, the hydraulic oil can be filled around the lock pin 41 to smoothly release locking.

In addition, by starting the engine, the hydraulic oil pressurized by the oil pump 4 is guided to the lock mechanism 40 through the passages 1b, 1c of the camshaft 1, the opening part 52 of the fastening bolt 50, the filter part 62 of the filter 60, a gap passage Cp defined by a cutout passage 71a, the through path 54 of the fastening bolt 50, and the communication path 27 formed on the back surface 24 of the vane rotor 20 and the annular oil reservoir C. When the hydraulic pressure applied to the tip pressure-receiving part 41a of the lock pin 41 increases, the lock pin 41 is detached from the lock hole 11d to remove locking.

Meanwhile, by stopping the engine, when the hydraulic pressure of the hydraulic oil that is supplied decreases, the hydraulic oil acting on the lock pin 41 flows out through the communication path 27 and the through path 54, the gap passage Cp, the filter 62, the opening part 52, and the paths 1c, 1b, and the hydraulic pressure pressurizing the lock pin 41 decreases. Then, the lock pin 41 is biased by the biasing spring 42 to be fit into the lock hole 11d of the housing rotor 10, and the vane rotor 20 is locked at the intermediate position with respect to the housing rotor 10.

As shown in FIGS. 2, 3, and 6 to 10, the fastening bolt 50 includes the cylindrical part 50a with the axis S as the center, an inner circumferential surface 51 to which the fluid control valve V is fit, the opening part 52, the annular receiving part 53, the through path 54, the retard passage 55, the advance passage 56, a flanged head part 57, a male screw part 58, a positioning concave part 59a, and an annular groove 59b.

The cylindrical part 50a is formed with an outer diameter dimension closely fit with the fitting hole 25 of the vane rotor 20. The inner circumferential surface 51 forms a cylindrical surface with the axis S as the center, so that the sleeve 70 is fit.

The opening part 52 is adjacent to the annular receiving part 53 in the direction of the axis S to be formed in a circular hole having a diameter smaller than the inner circumferential surface 51, and serves as a passage for the hydraulic oil to flow into the fastening bolt 50 on the upstream side with respect to the filter 60.

The annular receiving part 53 is an annular concave part and has a receiving surface formed as a planar surface perpendicular to the axis S, so as to face a bottom end 70a of the sleeve 70 on the inner side with respect to the opening part 52 in the direction of the axis S. The through path 54 guides the hydraulic oil in or out with respect to the lock mechanism 40, and penetrates in a radial direction perpendicular to the axis S in the cylindrical part 50a.

The retard passage 55 penetrates in a radial direction perpendicular to the axis S in the cylindrical part 50a to be in communication with the retard passage 28 of the vane rotor 20.

The advance passage 56 penetrates in a radial direction perpendicular to the axis S in the cylindrical part 50a to be in communication with the advance passage 29 of the vane rotor 20.

The flanged head part 57 abuts against the front surface 23 of the vane rotor 20 to sandwich the washer W. The male screw part 58 is screwed with the female screw part 1d of the camshaft 1.

The positioning concave part 59a is formed to be fit with the positioning convex part 79 of the sleeve 70 included in the fluid control valve V and a fitting convex part 114 of the snap ring 110. The annular groove 59b is adjacent to an opening end 70b of the sleeve 70 and formed to be recessed with respect to the inner circumferential surface 51, so that the snap ring 110 is fit into the annular groove 59b, such that plate spring pieces 63 of the filter 60 are compressed and the snap ring 110 abuts against the opening end 70b of the sleeve 70 fit with the inner circumferential surface 51.

The filter 60 serves to capture a foreign matter mixed into the hydraulic oil supplied by an oil pump 74, and is formed by using a metal plate spring material, such as a spring steel plate of stainless steel (SUS301, etc.). As shown in FIGS. 6, 7, 11, and 12, the filter 60 includes an annular plate part 61, the filter part 62, the plate spring piece 63, and a curved notch part 64 formed in a root region of the plate spring piece 63.

The annular plate part 61 forms an annular plate with the axis S as the center, and serves as a seal member in close contact with the annular receiving part 53 of the fastening bolt 50. The filter part 62 is formed by multiple micro pores 62$a$ formed in a circular region surrounded by the annular plate part 61. The pore diameter of the micro pore 62$a$ is smaller than the size of the foreign matter anticipated to be mixed into the hydraulic oil, and is formed in a size so that the passage resistance does not increase.

The plate spring piece 63 is formed to extend in the direction of the axis S from the outer edge of the annular plate part 61 and extend so that the tip end thereof expands toward the inner side of the axis S. That is, the plate spring piece 63 is formed to extend and curve to extend from the outer edge of the annular plate part 61. Accordingly, the plate spring piece 63 is formed to apply a biasing force in the direction of the axis S.

Here, the plate spring piece 63 is formed to include a first plate spring piece 63$a$, a second plate spring piece 63$b$, and a third plate spring piece 63$c$ disposed at equal intervals (intervals of 120 degrees) in the circumferential direction of the annular plate part 61.

In addition, the first plate spring piece 63$a$, the second plate spring piece 63$b$, and the third plate spring piece 63$c$ are disposed, so that one of the plate spring pieces 63$a$ abuts against a narrow abutting part 70$a_4$ of the sleeve 70 and the other two abut against a wide abutting part 70$a_5$. The curved notch part 64 is formed in a root region in which the plate spring pieces 63 extend from the annular plate part 61, alleviates the concentration of the stress generated in the root region when the plate spring pieces 63 are deformed elastically, and prevents cracks, etc., from occurring.

Figure 13:
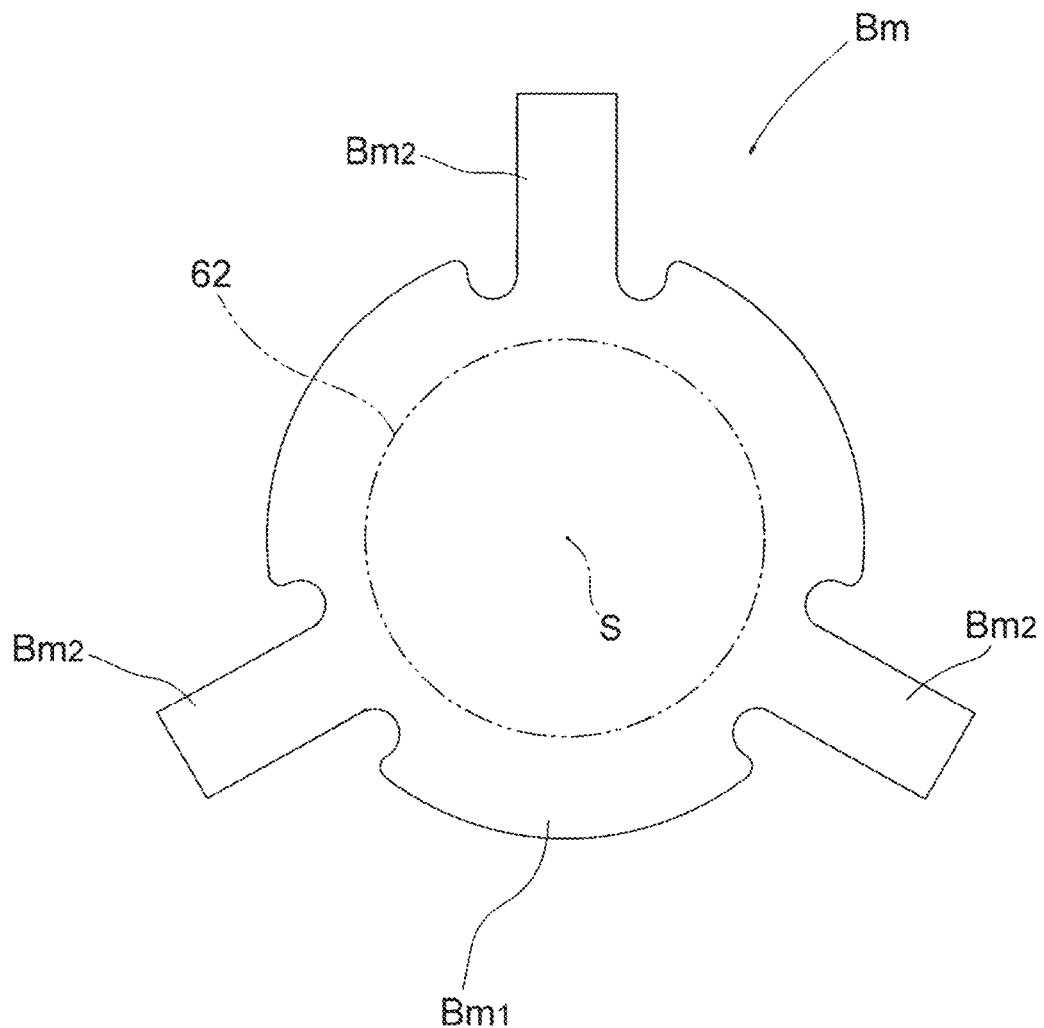
FIG. 13 is a plan view illustrating a state before a punching and bending process is applied to a filter included in the fluid control unit according to an embodiment from a spring steel plate as a metal spring material.

Regarding the manufacture of the filter 60, a spring steel plate of stainless steel (SUS301, etc.) with a plate thickness of about 0.2 mm to about 0.3 mm is punched out as a plate-shaped blank material Bm by using a punching machine, as shown in FIG. 13. Here, the blank material Bm forms a shape including a disk part Bm and three expansion pieces Bm$_2$ expanding radially from the disk part Bm$_1$.

In addition, in the blank material Bm, a resist film including multiple micro pores is coated on the inner side (a region corresponding to the filter part 62) of an annular region on the outer side of the disk part Bm$_1$, and an etching process (wet etching or dry etching) is applied from the outer side thereof. Accordingly, the micro pores 62$a$ are formed in the filter part 62. Here, the micro pore 62$a$ is formed as a circular hole with an inner diameter of about 0.2 mm, for example. Then, when the etching process ends, the resist film is removed.

Then, by using a bending machine, the expansion piece Bm$_2$ is subjected to a bending process, and the plate spring pieces 63 (the first plate spring piece 63$a$, the second plate spring piece 63$b$, and the third plate spring piece 63) are formed.

In a state of being assembled as a fluid control valve unit U, the filter 60 is sandwiched by the bottom end 70$a$ of the sleeve 70 (a narrow abutting part 70$a$4 and a wide abutting part 70$a_5$ as the abutting part) and the annular receiving part 53 of the fastening bolt 50.

Accordingly, the region of the filter part 62 is positioned in a region facing the opening part 52 of the fastening bolt 50 and the cutout passage 71$a$ of the sleeve 70, and the plate spring pieces 63 (the first plate spring piece 63$a$, the second plate spring piece 63$b$, and the third plate spring piece 63$c$) apply biasing forces biasing the sleeve 70 in the direction of the axis S with respect to the fastening sleeve 50.

In this way, the filter 60 is integrally formed by a metal plate spring material to include the annular plate part 61, the filter part 62, and multiple plate spring pieces 63. Therefore, compared with the filter formed by assembling various parts and materials, the structure can be simplified, and the cost can be reduced.

Here, the plate spring piece 63 is formed as multiple (three) plate spring pieces, i.e., the first plate spring piece 63$a$, the second plate spring piece 63$b$, and the third plate spring piece 63$c$. Therefore, the structure can be simplified, the spring force can be easily generated, and the entire region of the annular plate part 61 in the circumferential direction can be in close contact with the annular receiving part 53.

The fluid control valve V serves to switch the passages to supply or discharge the hydraulic oil with respect to the advance chamber AC and the retard chamber RC. As shown in FIGS. 9, 10, and 16 to 20, the fluid control valve V includes the sleeve 70, the spool 80, the biasing spring 90, and the check valve 100.

The sleeve 70 is formed by using aluminum or other metal materials, and is formed in a bottomed cylindrical shape defining the axis S. The sleeve 70 includes the bottom end 70$a$ and the opening end 70$b$ forming two ends in the direction of the axis S, the outer wall 71, the cutout passages 71$a$, 71$b$, 71$c$, a first communication path 71$d$ and through paths 71$d_1$, 71$d_2$ forming a portion of the discharge passage, a second communication path 71$e$ and a through path 71$e_1$ forming a portion of the discharge passage, a fitting hole 71$f$, a fitting pin 71$g$, a communication concave part 71$h$ forming a portion of the discharge passage, an inner circumferential surface 72, annular grooves 72$a$, 72$b$, 72$c$, an opening part 73, a supply port 74, a retard port 75, an advance port 76, a stopper wall 77, a spring receiving part 78, and a positioning convex part 79.

Figure 14:
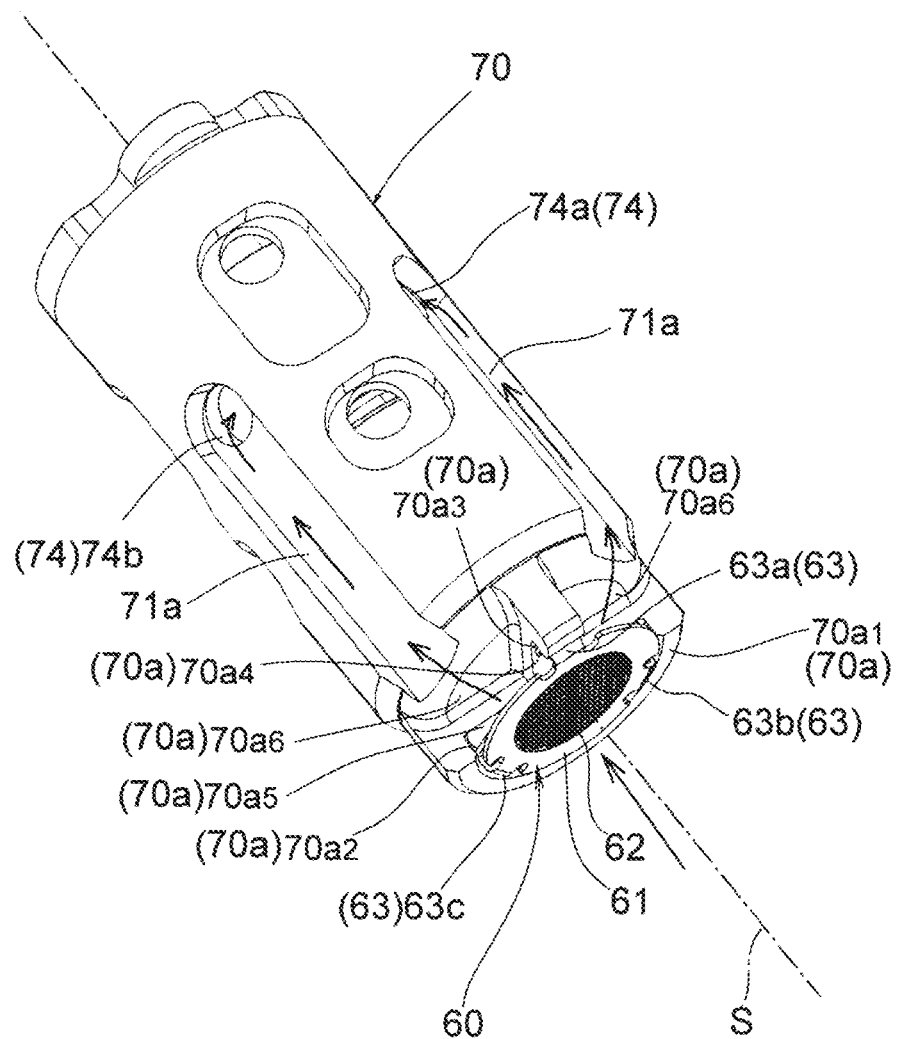
FIG. 14 is a perspective view illustrating the filter disposed in adjacency with a bottom end of a sleeve in the fluid control valve unit according to an embodiment.
Figure 15:
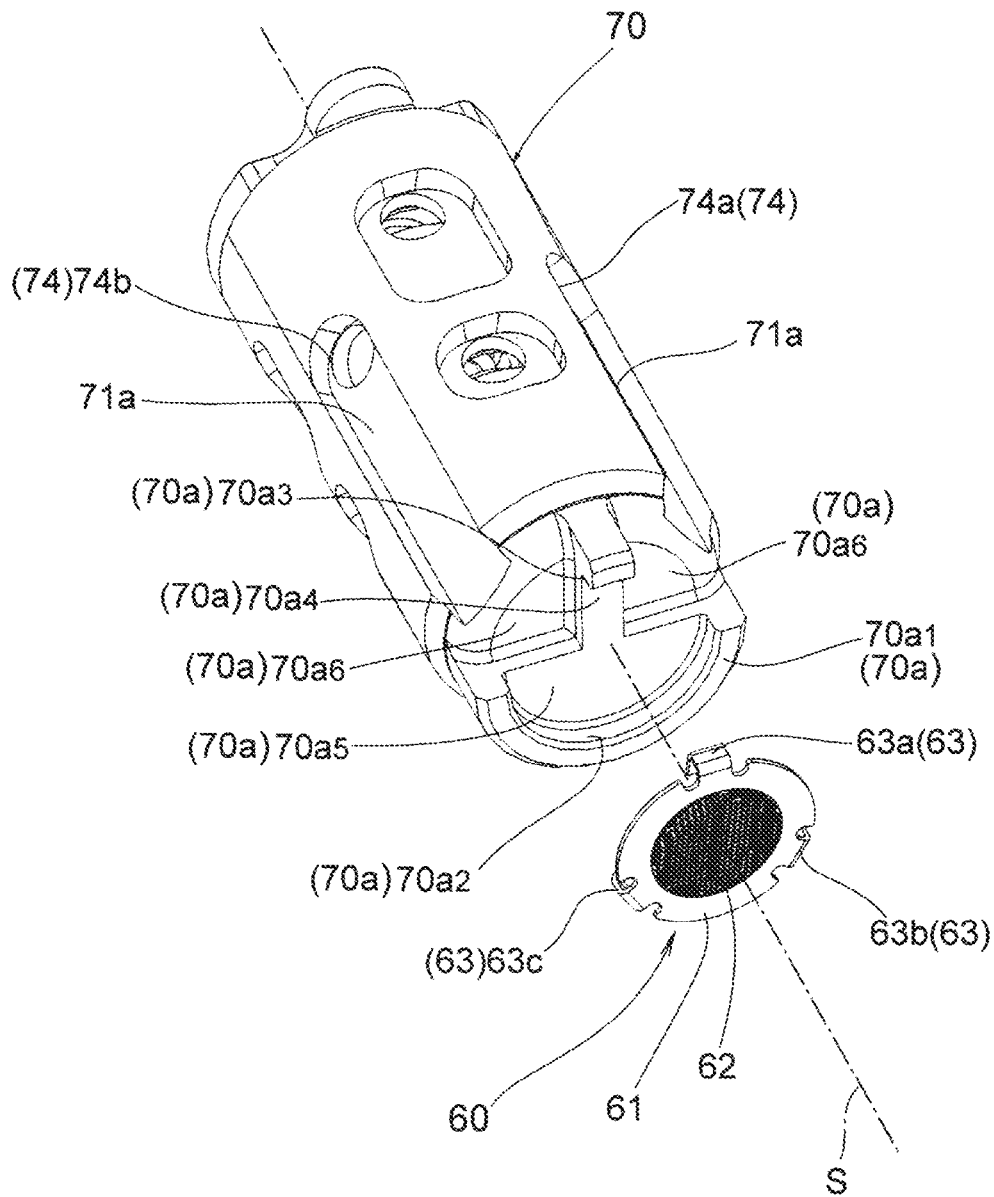
FIG. 15 is an exploded perspective view illustrating the sleeve and the filter in the fluid control valve unit according to an embodiment.
Figure 16:
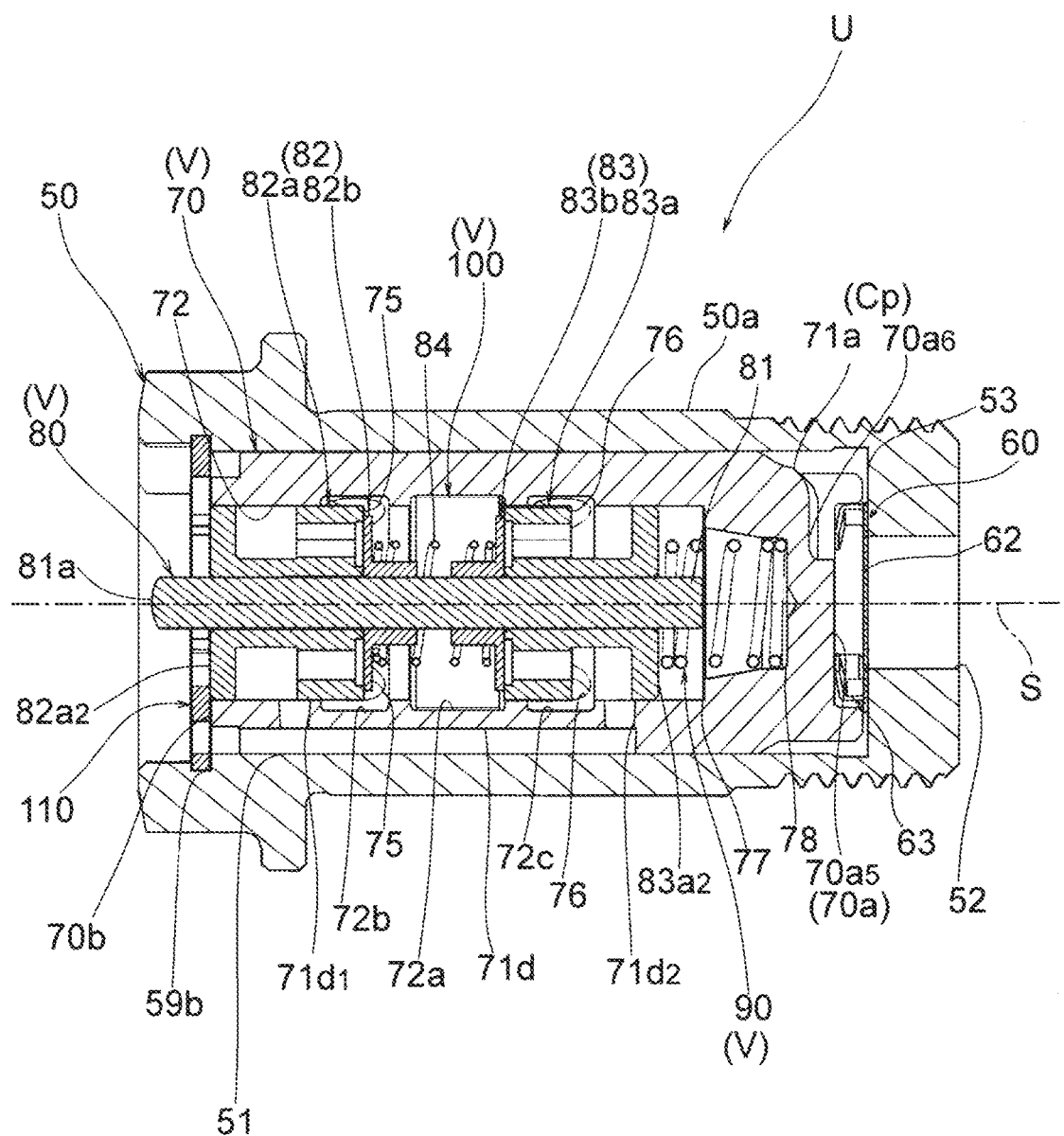
FIG. 16 is a cross-sectional view, illustrating the fluid control valve unit according to an embodiment, in a region of a discharge passage able to communicate with a first communication port and a second communication port.
Figure 17:
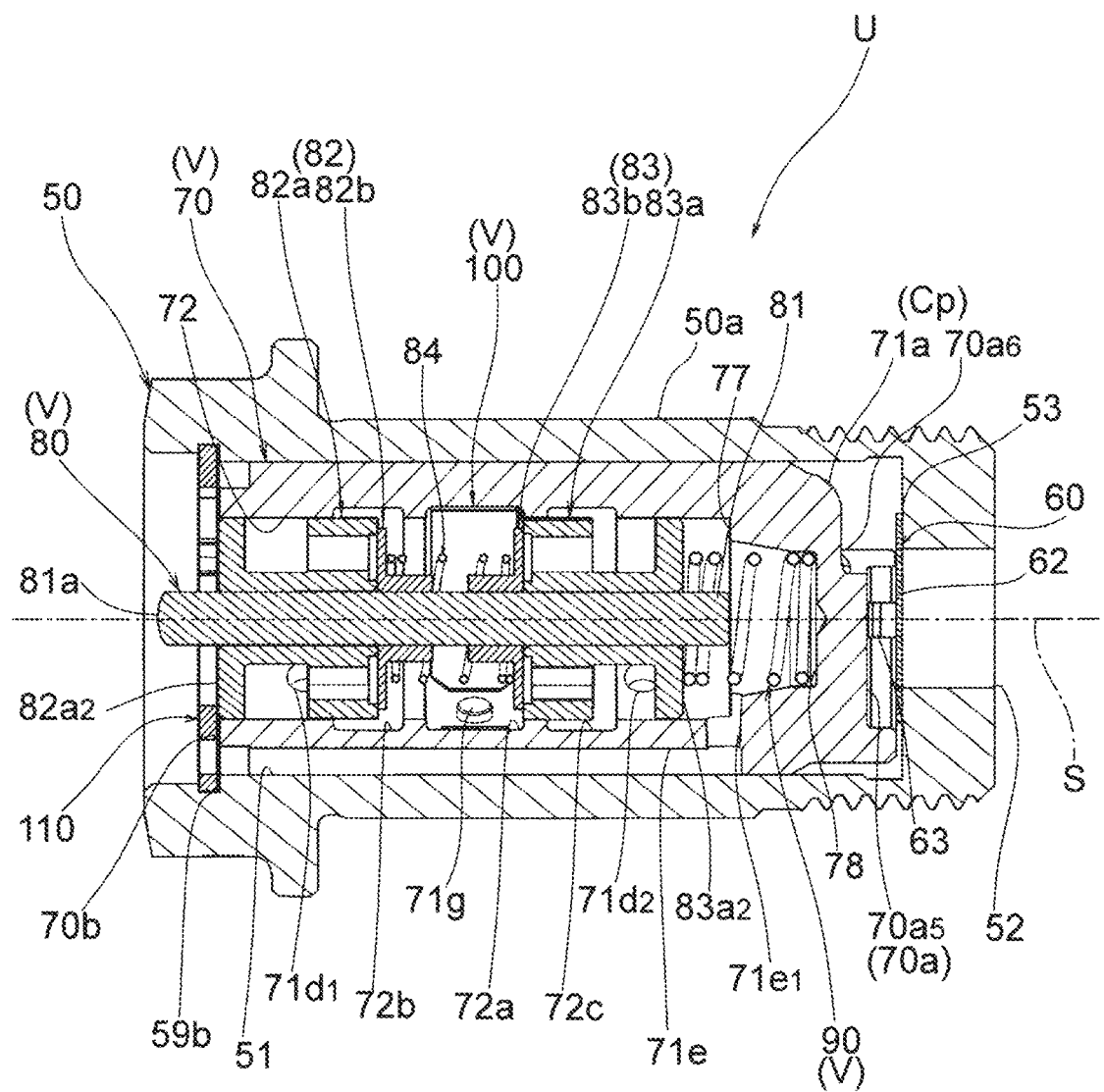
FIG. 17 is a cross-sectional view, illustrating the fluid control valve unit according to an embodiment, in a region of a discharge passage in communication with a region in which a biasing spring biasing a spool is disposed.

As shown in FIGS. 14 and 15, the bottom end 70$a$ is formed by an end surface 70$a_1$, inner wall parts 70$a_2$, 70$a_3$, the narrow abutting part 70$a_4$, the wide abutting part 70$a_5$, and two cutout parts 70$a_6$.

In an assembled state, the end surface 70$a_1$ is formed to face a predetermined gap in the direction of the axis S with respect to the annular receiving part 53, such as a gap comparable to the plate thickness of the filter 60.

The inner wall parts 70$a_2$, 70$a_3$ are formed so that the outer side surfaces of the plate spring pieces 63 are inserted into fine gaps, and position the filter 60 in a direction perpendicular to the axis S.

The narrow abutting part 70$a_4$ is located between the two cutout passages 71$a$, 71$a$ as first and second cutout passages when viewed in the direction of the axis S, expands in a direction perpendicular to the axis S, and is formed as a projected strip-shaped planar surface forming a rectangular cross-section.

In addition, the narrow abutting part 70$a$4 receives one of the first plate spring piece 63$a$, the second plate spring piece 63$b$, and the third plate spring piece 63$c$.

The wide abutting part 70$a_5$ is formed as a planar surface in a semi-circular shape perpendicular to the axis S on the same surface as the narrow abutting part 70$a_4$ in a region away from the two cutout passages 71$a$, 71$a$.

In addition, the wide abutting part 70$a_5$ receives the remaining two of the first plate spring piece 63$a$, the second plate spring piece 63$b$, and the third plate spring piece 63$c$.

The two cutout parts $70a^6$ are formed to be in communication with the two cutout passages 71a, 71a, respectively, as the passages of the hydraulic oil on two sides of the narrow abutting part $70a_4$.

As shown in FIGS. 9 and 16 to 19, the opening end 70b is in an annular shape with the axis S as the center, forms a planar surface perpendicular to the axis S, and is formed to abut against the annular receiving part 111 of the snap ring 110. In addition, in the state in which the sleeve 70 is assembled, the opening end 70b is received by the annular receiving part 111 of the snap ring 110 fit into the annular groove 59b of the fastening bolt 50 in the direction of the axis S.

The outer wall 71 is formed as the cylindrical surface with the axis S as the center, and is closely fit with the inner circumferential surface 51 of the fastening bolt 50.

The two cutout passages 71a expand from the central region of the bottom end 70a as the outer side of the bottom wall to be bifurcated via the cutout parts 70a6, are formed by cutting out portions of the outer wall 71 over regions facing the supply port 74 (a first supply port 74a, a second supply port 74b), and define the gap passage Cp together with the inner wall of the fastening bolt 50. The cutout passage 71b is formed by cutting out a portion of the outer wall 71 in a region facing the retard passage 55 of the fastening bolt 50 from the retard port 75 and serves as a passage between the retard port 75 and the retard passage 55.

The cutout passage 71c is formed by cutting out a portion of the outer wall 71 in a region facing the advance passage 56 of the fastening bolt 50 from the advance port 76 and serves as a passage between the advance port 76 and the advance passage 56.

The communication path 71d is formed to expand in the direction of the axis S on the outer wall 71, and serves as a discharge passage in cooperation with the through path $71d_1$ to communicate with the retard port 75 to be able to discharge the hydraulic oil when a first valve part 82 is closed and in cooperation with the through path 71d2 to communicate with the advance port 76 to discharge the hydraulic oil when a second valve part 83 is closed.

The communication path 71e is formed to expand in the direction of the axis S on the outer wall 71 at a position away from the communication path 71d, and cooperates with the through path $71e_1$ to serve as a discharge passage able to discharge the hydraulic oil accumulated in the region disposed in the biasing spring 90 and serving as a breathing path.

The fitting hole 71f is fit with the fitting pin 71g, and is formed as a double hole radially penetrating in the radial direction on the bottom wall of the annular groove 72a.

The fitting pin 71g forms a stepped pin in which two cylindrical columns having different outer diameters are integrally formed by using iron or steel materials, is closely fit with the fitting hole 71f, and protrudes radially inward from the bottom surface of the annular groove 72a so as not to interfere with the spool 80.

The communication concave part 71h is formed to be in communication with the first communication path 71d and the second communication path 71e in the circumferential direction on the outer wall 71 in the vicinity of the opening part 73.

The inner circumferential surface 72 is formed in a cylindrical shape with the axis S as the center, and closely and slidably guides the first valve part 82 (a first land $82a_1$) and the second valve part 83 (a second land $83a_1$) of the spool 80.

The annular groove 72a is formed as a cylindrical surface annularly cut out in an annular shape so as to be recessed from the inner circumferential surface 72 in a width greater than the opening width of the supply port 74 in the direction of the axis S in a region facing the supply port 74 as an inlet, and the check valve 100 is disposed on the inner side of the annular groove 72a.

The annular groove 72b is formed by being cut out in an annular shape, so as to be recessed from the inner circumferential surface 72, in a region facing the retard port 75 as the first communication port and serves as a passage of the hydraulic oil.

The annular groove 72c is formed by being cut out in an annular shape, so as to be recessed from the inner circumferential surface 72, in a region facing the advance port 76 as the second communication port, and serves as a passage of the hydraulic oil.

The opening part 73 allows the rod 81 of the spool 80 to project toward the direction of the axis S.

The supply port 74 serves as an inlet through which the hydraulic oil flows in as fluid, communicates with the gap passage Cp, and is disposed on the downstream side with respect to the through path 54 in the gap passage 54.

Figure 10:
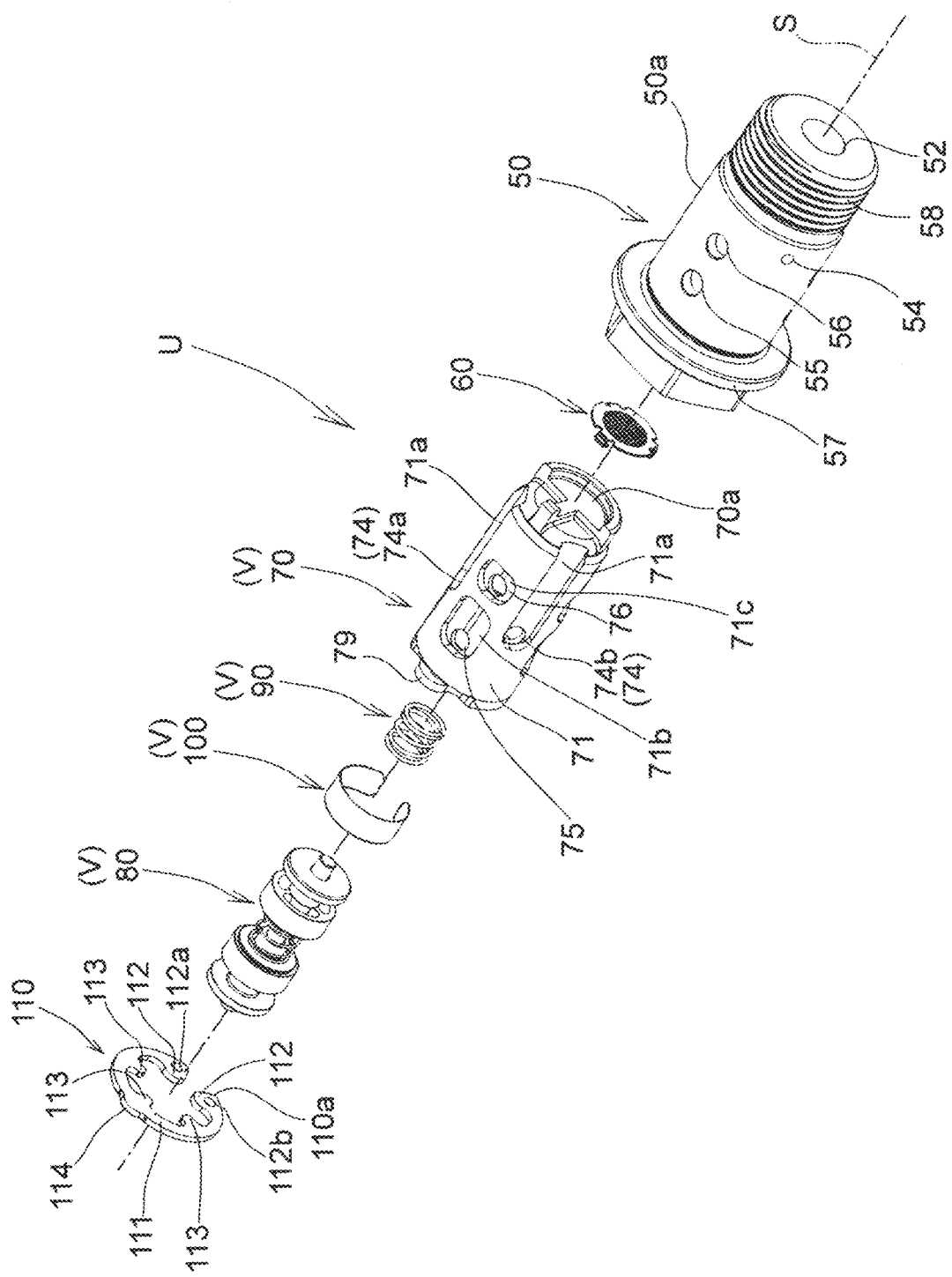
FIG. 10 is an exploded perspective view, when viewed from the oblique rear of the side of the camshaft to which the valve timing change device is installed, illustrating the fluid control valve unit according to an embodiment.
Figure 11:
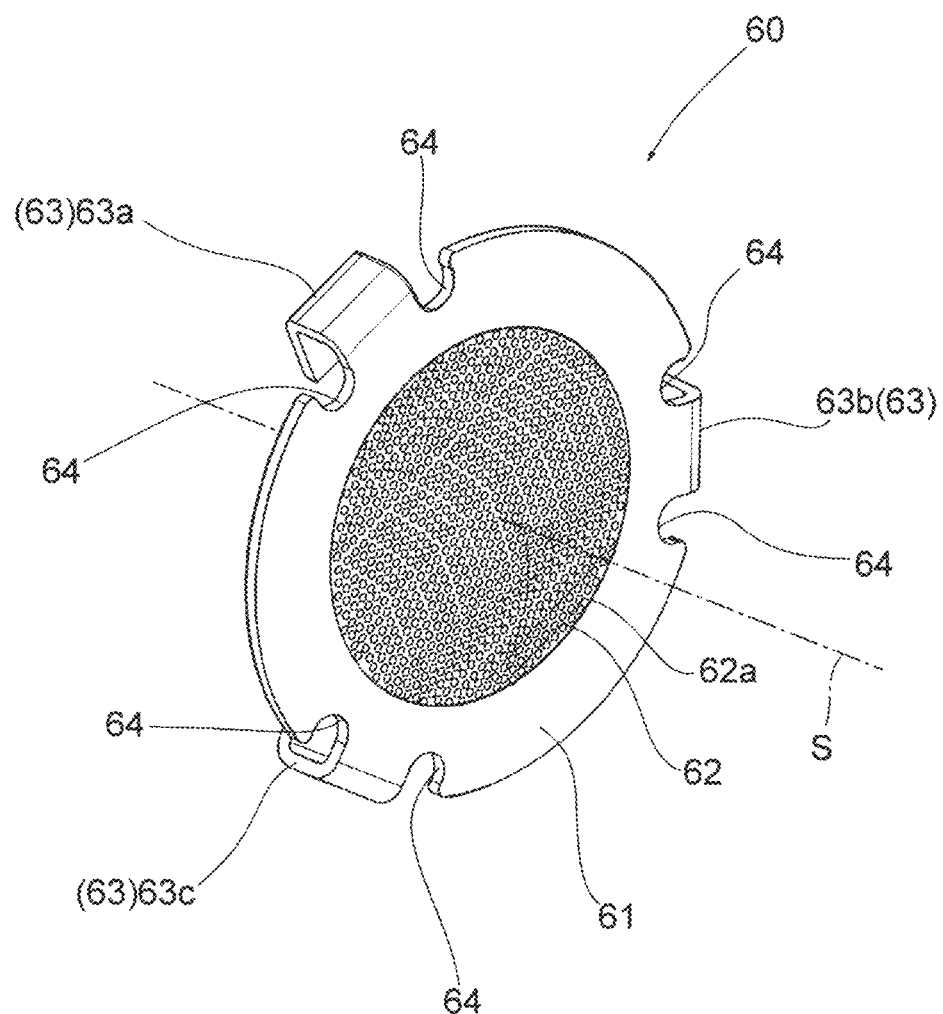
FIG. 11 is a perspective view, when viewed from the side of an annular plate part, illustrating a filter included in the fluid control valve unit according to the invention.
Figure 12:
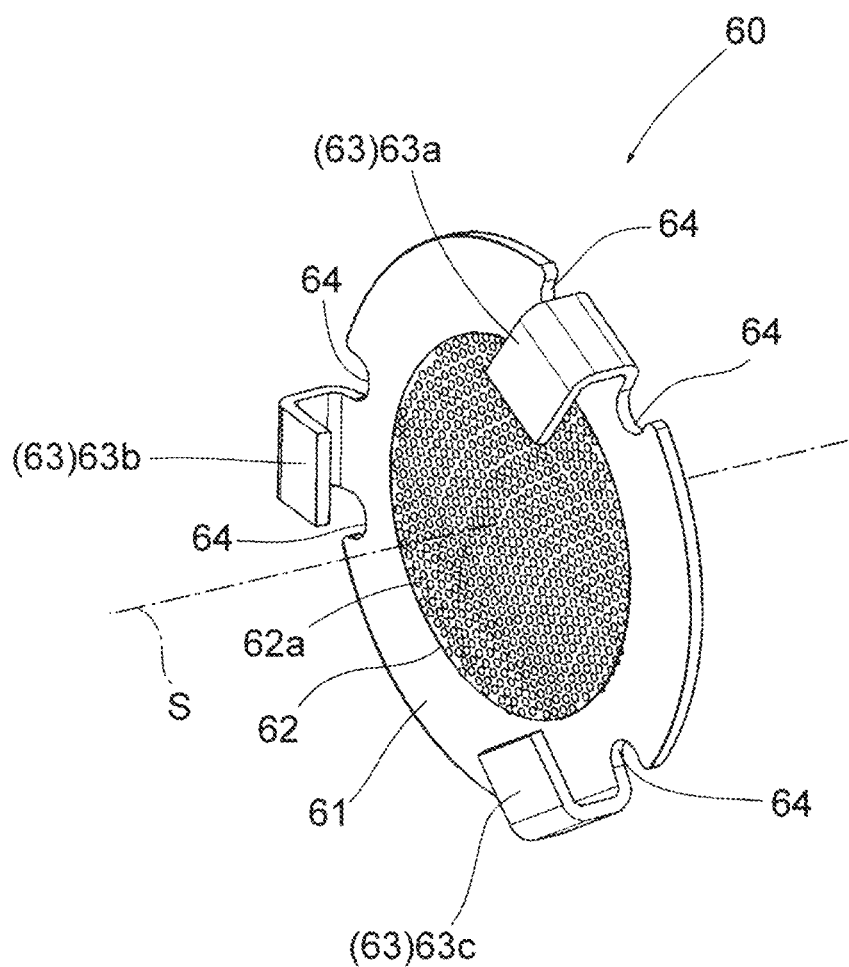
FIG. 12 is a perspective view, when viewed from the side of multiple plate spring pieces, illustrating the filter included in the fluid control valve unit according to an embodiment.

In addition, as shown in FIG. 10, the supply port 74 includes the first supply port 74a as a first inlet and the second supply port 74b as a second inlet, the first supply port 74a and the second supply port 74b being provided to be spaced apart from each other about the axis S.

The retard port 75 serves as the first communication port in communication with the outside so that the hydraulic oil as fluid passes through, communicates with the retard passage 55 of the fastening bolt 50 via the cutout passage 71b, and communicates with the retard chamber RC via the retard passage 28 of the vane rotor 20.

The advance port 76 serves as the second communication port in communication with the outside so that the hydraulic oil as fluid passes through, communicates with the advance passage 56 of the fastening bolt 50 via the cutout passage 71c, and communicates with the advance chamber AC via the advance passage 29 of the vane rotor 20.

Figure 18:
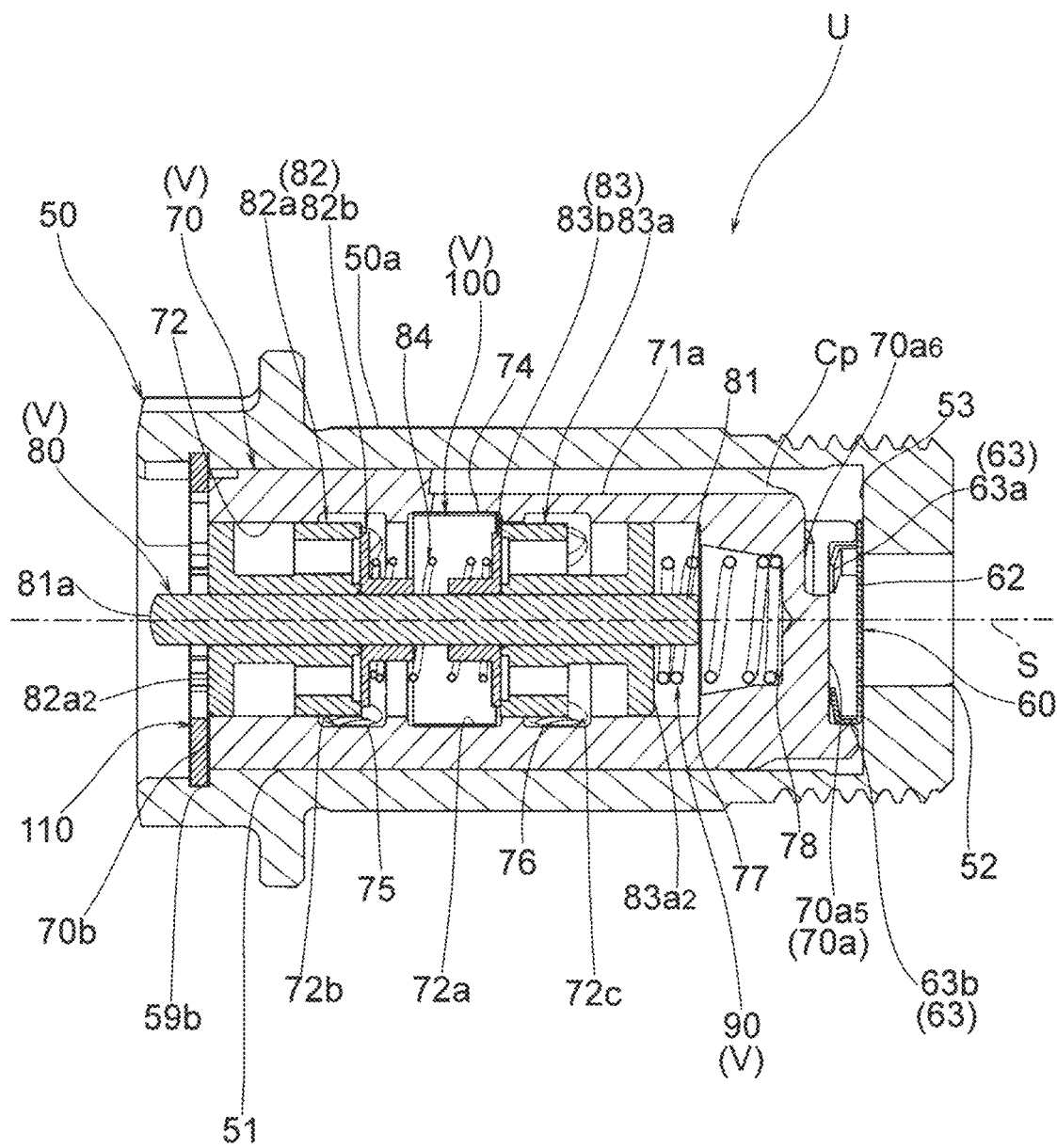
FIG. 18 is a cross-sectional view, illustrating the fluid control valve unit according to an embodiment, in a region of a cutout passage and an inlet (supply port).
Figure 19:
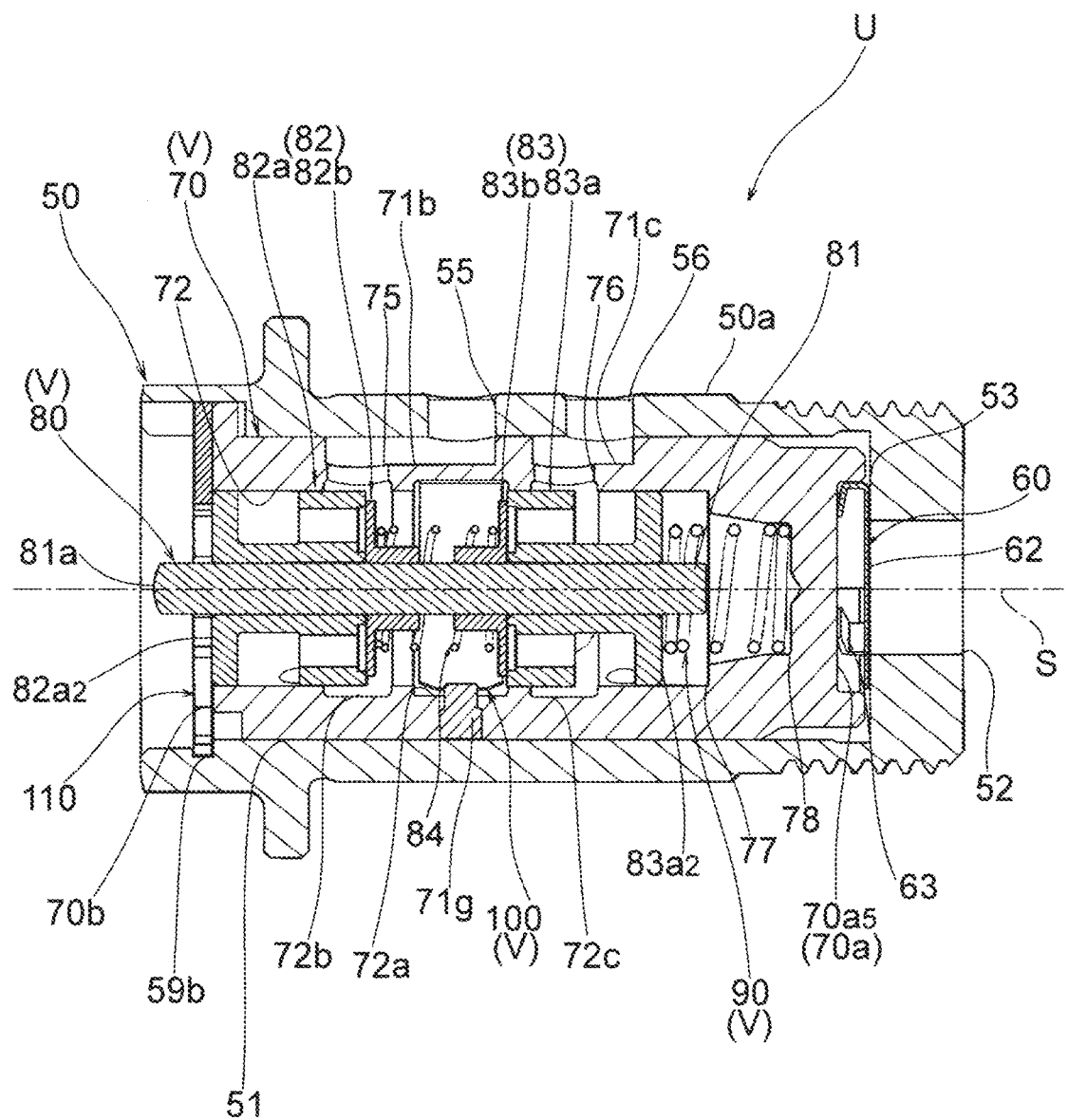
FIG. 19 is a cross-sectional view, illustrating the fluid control valve unit according to an embodiment, in a region of a first communication port (retard port) and a second communication port (advance port).
Figure 20:
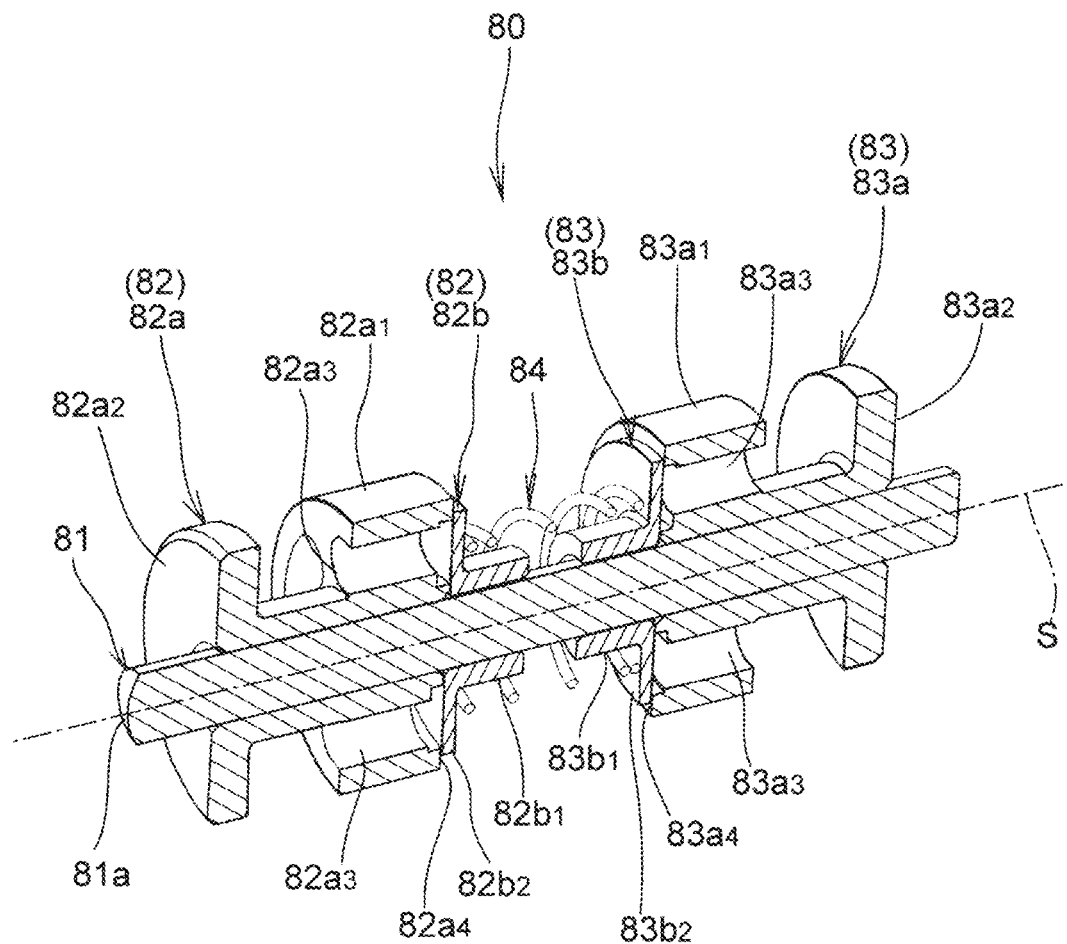
FIG. 20 is a perspective cross-sectional view illustrating the spool included in the fluid control valve unit according to the invention and taken along a surface including an axis.

Here, as shown in FIGS. 18 and 19, the retard port 75 and the advance port 76 are disposed to be located on two sides sandwiching the supply port 74 in the direction of the axis S. That is, the communication port communicating with the outside so that the fluid passes through includes the first communication port (the retard port 75) and the second communication port (the advance port 76) located on two sides sandwiching the inlet (the supply port 74) in the direction of the axis S. The stopper wall 77 receives an end surface $83a^2$ of the second valve part 83 of the spool 80, and stops the spool 80 at the innermost position corresponding to the advance mode.

The spring receiving part 78 receives the end of the biasing spring 90.

The positioning convex part 79 is fit with the positioning concave part 59a of the fastening bolt 50, so as to position the sleeve 70 at a predetermined position about the axis S with respect to the fastening bolt 50, when the sleeve 70 is fit with the inner circumferential surface 51 of the fastening bolt 50.

As described above, the discharge passage (the first communication path 71d, the second communication path 71e, the communication concave part 71h) through which the hydraulic oil discharged to the outside passes is formed on the outer wall 71 in the sleeve 70. Therefore, it is not required to provide a discharge passage in the fastening bolt 50 as a passage member. Consequently, the fluid control valve V including the sleeve 70 can be applied to various conventional passage members.

As shown in FIGS. 16 to 20, the spool 80 is disposed on the inner side of the sleeve 70 to be slidable on the inner circumferential surface 72, and includes the rod 81 expanding in the direction of the axis S, the first valve part 82 and the second valve part 83 provided at the rod 81, and a compression spring 84 disposed between the first valve part 82 and the second valve part 83. The rod 81 is formed to expand in the direction of the axis S and includes an end 81a exposed to the outside. The driving shaft 7a of the electromagnetic actuator 7 is engaged with the end 81a, and a driving force is applied against the biasing force of the biasing spring 90.

The first valve part 82 serves to open/close a passage between the supply port 74 and the retard port 75, and includes a first fixed part 82a and a first movable part 82b. The first fixed part 82a is fixed to the rod 81. The first movable part 82b is movably supported along the rod 81 and biased by the compression spring 84.

The first fixed part 82a includes a first land $82a_1$, an end surface $82a_2$, a first inner passage $82a_3$, and an end surface $82a_4$. The first land $82a_1$ slides closely on the inner circumferential surface 72.

The first land $82a_1$ is a cylindrical surface having an outer diameter the same as or slightly smaller than the inner diameter of the inner circumferential surface 72, with the axis S as the center, and having a width dimension blocking the retard port 75, and opens or blocks the retard port 75.

The first movable part 82b cooperates with the compression spring 84 to serve as a check valve, and includes a first fitting part $82b_1$ and a first cover part $82b_2$. The first fitting part $82b_1$ is slidably fit with the rod 81. The first cover part $82b_2$ detachably abuts against the end surface $82a_4$, so as to open/close the first inner passage $82a_3$.

The second valve part 83 serves to open/close a passage between the supply port 74 and the advance port 76, and includes a second fixed part 83a and a second movable part 83b. The second fixed part 83a is fixed to the rod 81. The second movable part 83b is movably supported along the rod 81 and biased by the compression spring 84.

The second fixed part 83a includes a second land $83a_1$, an end surface $83a_2$, a second inner passage $83a_3$, and an end surface $83a_4$. The second land $83a_1$ slides closely on the inner circumferential surface 72.

The second land $83a_1$ is a cylindrical surface having an outer diameter the same as or slightly smaller than the inner diameter of the inner circumferential surface 72, with the axis S as the center, and having a width dimension blocking the advance port 76, and opens or blocks the retard advance76.

The second movable part 83b cooperates with the compression spring 84 to serve as a check valve, and includes a second fitting part $83b_1$ and a second cover part $83b_2$. The second fitting part $83b_1$ is slidably fit with the rod 81. The second cover part $83b_2$ detachably abuts against the end surface $83a_4$, so as to open/close the second inner passage $83a_3$.

The compression spring 84 is a compression-type coil spring and disposed between the first movable part 82b of the first valve part 82 and the second movable part 83b of the second valve part 83, and applies a biasing force so that the first cover part $82b_2$ blocks the first inner passage $82a_3$ and the second cover part $83b_2$ blocks the second inner passage $83a_3$.

Here, the relationship between the biasing force of the compression spring 84 and the passage resistance of the through paths $71d_1$ and $71d_2$ forming a portion of the discharge passage is described.

In the valve-closed state of the first valve part 82, when the pressure of the hydraulic oil flowing in from the retard port 75 is large, the first cover part $82b_2$ is opened, the hydraulic oil discharged from the discharge passage (the through path $71d_1$) decreases, and the hydraulic oil actively flows toward the side of the advance port 76; meanwhile, when the pressure of the hydraulic oil flowing in from the retard port 75 is small, the first cover part $82b_2$ is closed, and the hydraulic oil is actively discharged from the discharge passage (the through path $71d_1$).

In addition, in the valve-closed state of the second valve part 83, when the pressure of the hydraulic oil flowing in from the advance port 76 is large, the second cover part $83b_2$ is opened, the hydraulic oil discharged from the discharge passage (the through path $71d_2$) decreases, and the hydraulic oil actively flows toward the side of the retard port 75; meanwhile, when the pressure of the hydraulic oil flowing in from the advance port 76 is small, the second cover part $83b_2$ is closed, the hydraulic oil is actively discharged from the discharge passage (the through path $71d_2$).

To perform the operation, the biasing force of the compression spring 84 and the passage resistance of the through paths $71d_1$, $71d_2$ are set.

The biasing spring 90 is a compression type coil spring. As shown in FIGS. 16 to 19, the biasing spring 90 is assembled so that an end abuts against the end surface $83a_2$ of the spool 80, and the other end abuts against the spring receiving part 78 of the sleeve 70. In addition, in the inactive state, the biasing spring 90 applies a biasing force that stops the spool 80 at a position corresponding to the retard mode, that is, an inactive position where the end surface $82a_2$ of the spool 80 abuts against protrusive receiving parts 112, 113 of the snap ring 110.

The check valve 100 is a C-shaped spring in which an elongated plate spring formed by spring steel is curved into an annular shape to make two ends face each other to form a notch part of a predetermined gap, and which is curved in advance to form an outer diameter greater than the inner diameter of the annular groove 72a.

In addition, the check valve 100 is disposed at the annular groove 72a of the sleeve 70 in a diameter-reducible manner, so that the fitting pin 71g is located at the gap of the notch part, and serves as a check valve that only allows the supplied hydraulic oil to flow in through the supply port 74 of the sleeve 70.

It is noted that, the check valve 100 is set with a valve-opening property, so that, after the supplied hydraulic oil flows into the fluid control valve V through the supply port 74 and the gap passage Cp defined by the passages 1b, 1c, the opening part 52, the filter part 62, the cutout part 70a6, and the cutout passage 71a and is supplied to the retard chamber CR from the retard port 75 or the advance chamber AC from the advance port 76, when the hydraulic pressure of the hydraulic oil filled in the through path 54 and the communication path 27 reaches a hydraulic pressure able to release the lock mechanism 40, locking is released.

Figure 8:
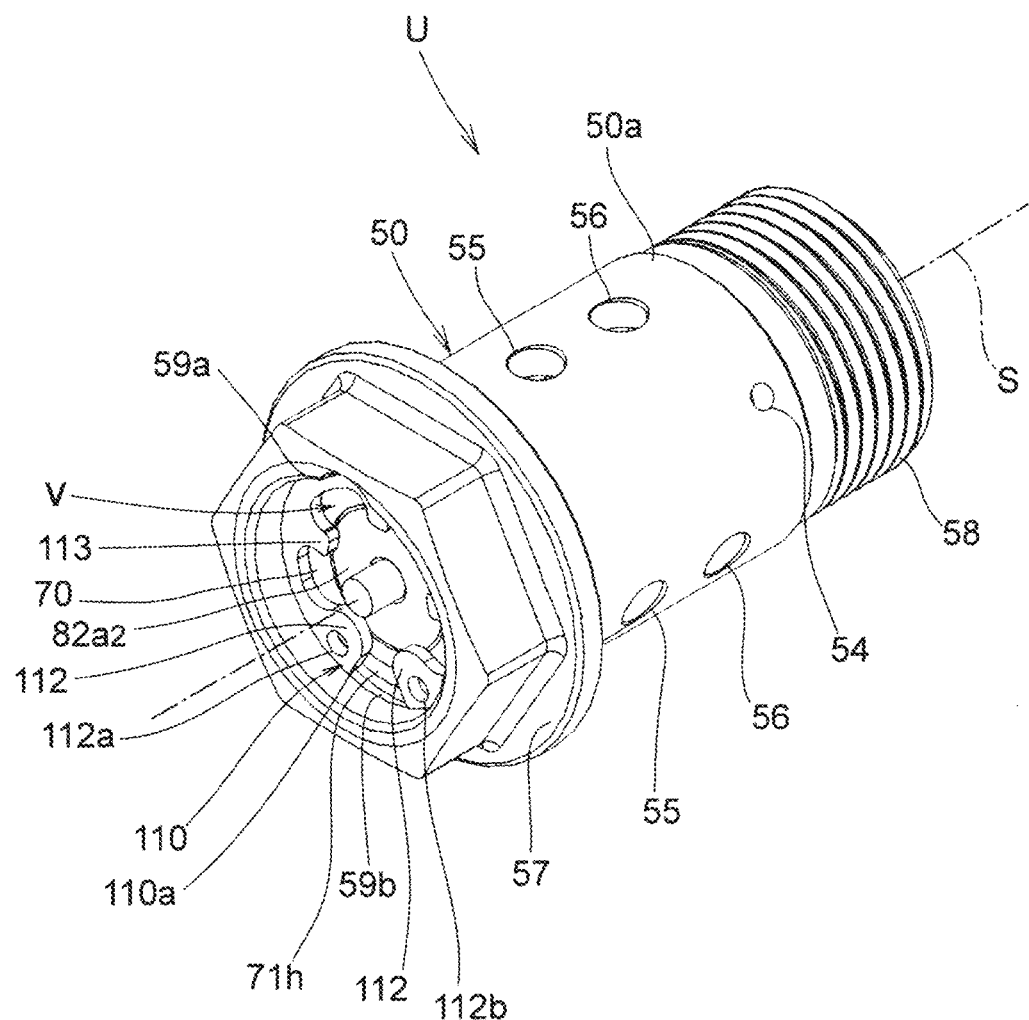
FIG. 8 is an appearance perspective view illustrating a fluid control valve unit according to an embodiment.
Figure 9:
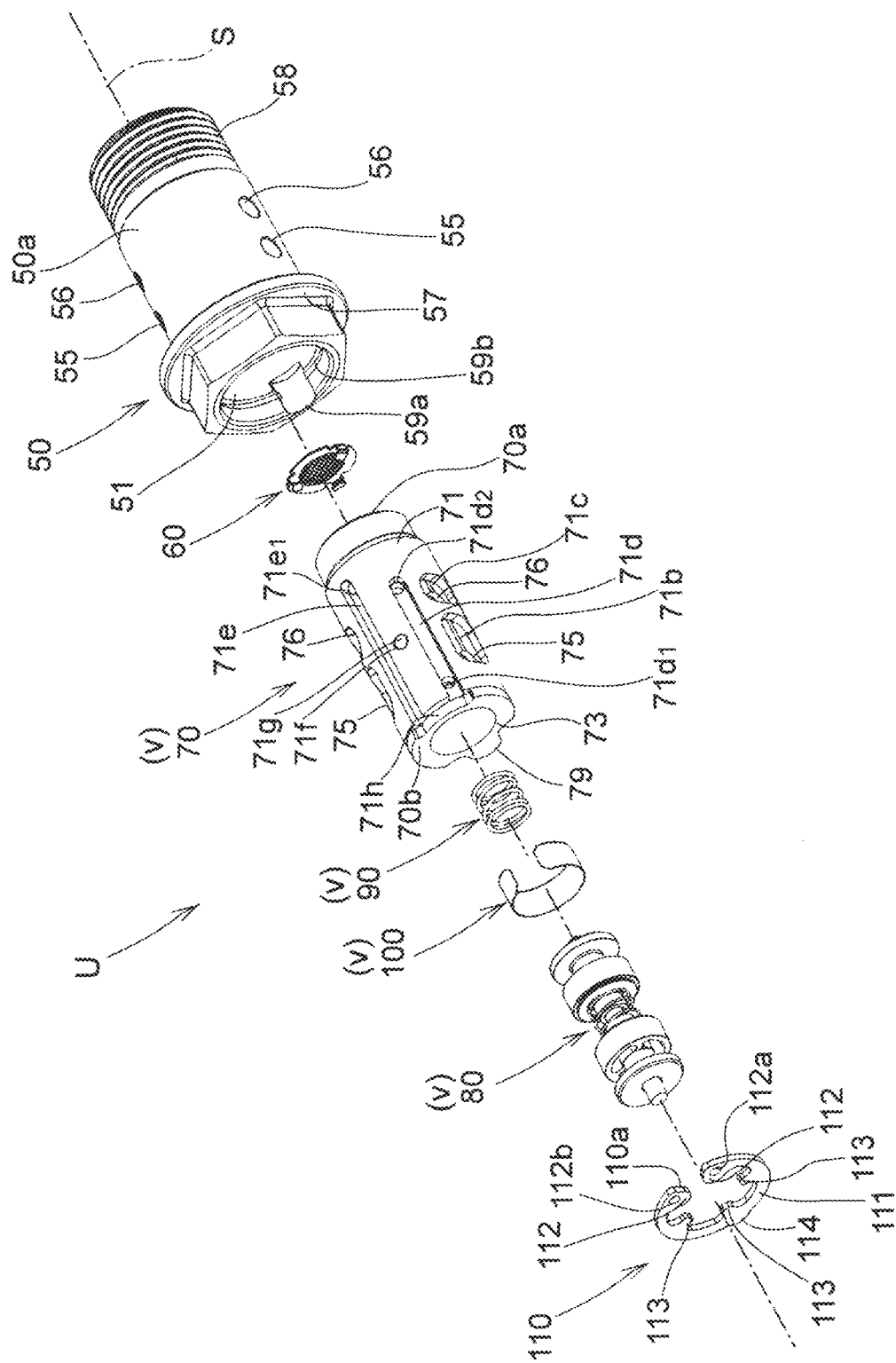
FIG. 9 is an exploded perspective view, when viewed from the oblique front of the side opposite to the camshaft to which the valve timing change device is assembled, illustrating the fluid control valve unit according to an embodiment.

The snap ring 110 is fit into the annular groove 59b of the fastening bolt 50 and is formed by spring steel, etc. As shown in FIGS. 8 to 10, the snap ring 110 forms a plate shape expanding in a direction perpendicular to the axis S and is formed in a substantially C shape having a notch part 110a of a predetermined gap.

In addition, the snap ring 110 includes multiple (five in the embodiment) protrusive receiving parts 112, 113 and a fitting convex part 114. The protrusive receiving parts 112, 113 protrude radially inward from the annular receiving part 111 at substantially equal intervals about the axis S.

The annular receiving part 111 receives the opening end 70b of the sleeve 70 inserted into the inner circumferential surface 51 of the fastening bolt 50.

The two protrusive receiving parts 112 and three protrusive receiving parts 113 respectively receive the opening end 70b of the sleeve 70 in a root side region and detachably receive the end surface 82a of the spool 80 in a tip end side region.

The two protrusive receiving part 112 are provided in the vicinities of the two ends defining the notch part 110a, and formed with two circular holes 112a, 112b.

The two circular holes 112a, 112b are provided for the tip of a tool (e.g., a snap ring plier) to be inserted when the snap ring 110 is assembled to the annular groove 59b.

In the snap ring 110 with such configuration, the notch part 110a and the two circular holes 112a, 112b serve as discharge ports able to discharge the hydraulic oil flowing through the discharge passage (the first communication path 71d, the second communication path 71e, the communication concave part 71h).

The fitting convex part 114 is formed to be fit with the positioning concave part 59a of the fastening bolt 50, so that the discharge port (the notch part 110a and the two circular holes 112a, 112b) corresponds to the discharge passage (the first communication path 81b, the second communication path 71e, and the communication concave part 71h).

That is, as shown in FIGS. 10 and 16 to 19, in the state in which the filter 60 is fit with the bottom end 70a of the sleeve 70, the fluid control valve V (the sleeve 70, the spool 80, the biasing spring 90, and the check valve 100) is fit into the inner circumferential surface 51 of the fastening bolt 50, and the bottom end 70a of the sleeve 70 presses the filter 60 in the direction of the axis S, by being fit into the annular groove 59b of the fastening bolt 50, the snap ring 110 receives the opening end 70b of the sleeve 70 accommodated in the fastening bolt 50 and detachably receives the spool 80, and is able to discharge the hydraulic oil flowing through the discharge passage (the first communication path 71d, the second communication path 71e, and the communication concave part 71h) formed in the fastening bolt 50.

Consequently, in the direction of the axis S inside the fastening bolt 50, the sleeve 70 is fixed in a state in which the bottom end 70a faces the annular receiving part 53 by sandwiching the filter 60 including the plate spring pieces 63, the opening end 70b abuts against the snap ring 110 fit into the annular groove 59b of the fastening bolt 50, and the biasing forces of the plate spring pieces 63 are applied in the direction of the axis S.

According to the above, the fluid control valve unit U includes: the fluid control valve V; the fastening bolt 50 as a cylindrical passage member; the filter 60 disposed between the bottom end 70a of the sleeve 70 and the annular receiving part 53 of the fastening bolt 50; and the stopper receiving the opening end 70b of the sleeve 70 accommodated in the fastening bolt 50. The filter 60 is integrally formed by using a metal plate spring material, so as to include the annular plate part 61, the filter 62 surrounded by the annular plate part 61, and the plate spring pieces 63 extending from the annular plate part 61 to apply biasing forces in the direction of the axis S. Accordingly, by assembling the filter 60 as one component between the annular receiving part 53 of the fastening bolt 50 and the bottom end 70a of the sleeve 70, the maintaining function of applying the spring biasing force, the filter function, and the seal function can be attained, the structure can be simplified, the number of components can be reduced, the assembling process can be simplified, foreign matters can be prevented from entering, and the functional reliability can be facilitated.

In particular, the filter 60 is formed by a single metal plate spring material. Therefore, compared with one formed by combining multiple components, the cost can be reduced, and the durability can be facilitated.

Moreover, the fastening bolt 50 as the passage member has the annular groove 72a adjacent to the opening end 70b in the direction of the axis S and is recessed with respect to the inner circumferential surface 72, and, as the stopper, the snap ring 110 fit into the annular groove 72a detachably receiving the spool 80 is adopted.

Accordingly, the rattling of the sleeve 70 in the direction of the axis S inside the fastening bolt 50 can be avoided. Therefore, the communication holes (the retard port 75, the advance port 76) provided at the sleeve 70 can be positioned at predetermined positions with respect to the passage of the fastening bolt 50 (the retard passage 55 and the advance passage 56).

In addition, the opening/closing operation can be reliably performed by moving the spool 80 by the movement amount set in advance, and the controllability of the spool 80 is increased. Moreover, since the snap ring 110 is fit into the annular groove 59b of the fastening bolt 50, the impact resistance in the direction of the axis S is increased, and the sleeve 70 can be reliably positioned and fixed to the predetermined position.

Also, in the filter 60, with the annular plate part 61 being disposed to abut against the annular receiving part 53 and the plate spring pieces 63 being disposed to abut against the bottom end 70a, the annular plate part 61 can be brought into close contact with the annular receiving part 53. Accordingly, sealing performance can be ensured, so that a foreign matter in the hydraulic oil flowing in from the opening part 52 does not flow to the downstream side of the filter 60 from the gap.

Moreover, the filter part 62 of the filter 60 is formed to include multiple micro pores 62a formed through an etching process, and the plate spring pieces 63 are formed to extend from the outer edge of the annular plate part 61 and be bent.

In this way, it is possible to form the micro pores 62a with a desired pore diameter by suitably adjusting the etching process with respect to the blank material Bm in which a metal plate spring material is punched, and it is possible to form the plate spring pieces 63 simply by performing a bending process, and it is possible to easily manufacture the filter 60 as a whole.

In addition, in the region of the bottom end 70a, the sleeve 70 includes the cutout passages 71a formed on the outer wall 71 to supply the fluid passing through the filter 60 to the inlet (the supply port 74), and the abutting part abutting against the plate spring pieces 63 of the filter 60. The cutout passages include the two cutout passages 71a, 71a as the first cutout passage and the second cutout passage formed as separated from each other about the axis S. The abutting parts include the narrow abutting part 70a4 located between the first cutout passage (the cutout passage 71a) and the second cutout passage (the cutout passage 71a) and the wide abutting part 70a5 away from the cutout passages. The plate spring piece 63 is formed to include the first plate spring piece 63a, the second plate spring piece 63b, and the third plate spring piece 63c disposed at equal intervals in the circumferential direction of the annular plate part 61.

Accordingly, while sufficiently ensuring the passage of the flow of the hydraulic oil, the spring force can be generated with the structure being simplified, and the entire region of the annular plate part 61 in the circumferential direction can be in close contact with the annular receiving part 53.

In addition, the fluid control valve V includes the check valve 100 disposed on the inner side of the sleeve 70 to allow the hydraulic oil to flow in from the inlet (the supply port 74). Therefore, compared with a configuration such as conventional examples in which the check valve is provided on the outer side of the sleeve 70, the size can be reduced, and the integration level can be increased.

In addition, the snap ring 110 has the discharge port (the notch part 110a and the circular holes 112a, 112b) able to discharge the hydraulic oil flowing through the discharge passage (the first communication path 71d, the second communication path 71e, and the communication concave part 71h) formed in the passage member (the fastening bolt 50). Therefore, at the time of changing the valve timing in the valve timing change device M, extra hydraulic oil can be smoothly discharged without remaining, and a desired change operation can be attained.

In addition, the snap ring 110 is formed in a plate shape that expands in a direction perpendicular to the axis S. Therefore, compared with a bottomed cylindrical shape, the thickness in the direction of the axis S can be reduced, and the size of the fluid control valve unit U can be reduced.

In the following, an operation of the valve timing change device M in which the fluid control valve unit U can be mounted.

In the state in which the internal combustion engine is stopped, as shown in FIG. 21, the vane rotor is locked at the intermediate position with respect to the housing rotor 10 by using the lock mechanism 40.

In this way, the internal combustion engine can be smoothly started without rattling of the vane rotor 20, etc. When the internal combustion engine is stopped, except for the amount that leaks from gaps, etc., the hydraulic oil is generally filled in the retard chamber RC through the opening of the first valve part 82 at the inactive position (the state in which communication between the first communication path 71d and the through path 71$d_1$ and the retard port 75 is cut off) and a backflow prevention function of the check valve 100.

In addition, with the starting of the internal combustion engine, the hydraulic oil supplied through the gap passage Cp defined by the passages 1b, 1c, the opening part 52, the cutout part 70a6, and the cutout passage 71a opens the check valve 100 and flows into the fluid control valve V from the supply port 74, and is supplied to the retard chamber RC from the retard port 75 or to the advance chamber AC from the advance port 76.

Then, when the hydraulic pressure of the hydraulic oil guided to the lock mechanism 40 through the through path 54 and the communication path 27 reaches a releasable hydraulic oil, the lock pin 41 is detached from the lock hole 11d, and the locking is canceled. In addition, after the internal combustion engine is started, the position of the spool 80 of the fluid control valve V is properly controlled via the driving shaft 7a of the electromagnetic actuator 7, and phase control is performed so that the vane rotor 20 and the camshaft 1 are toward the retard side or the advance side or maintained at a predetermined angle.

Firstly, the operation when the internal combustion engine is at a low-speed operation state is described. In the low-speed operation state, following the torque change (ΔT, −ΔT) applied by the camshaft, the hydraulic oil in the retard chamber RC and the advance chamber AC is able to be reciprocated.

Figure 24:
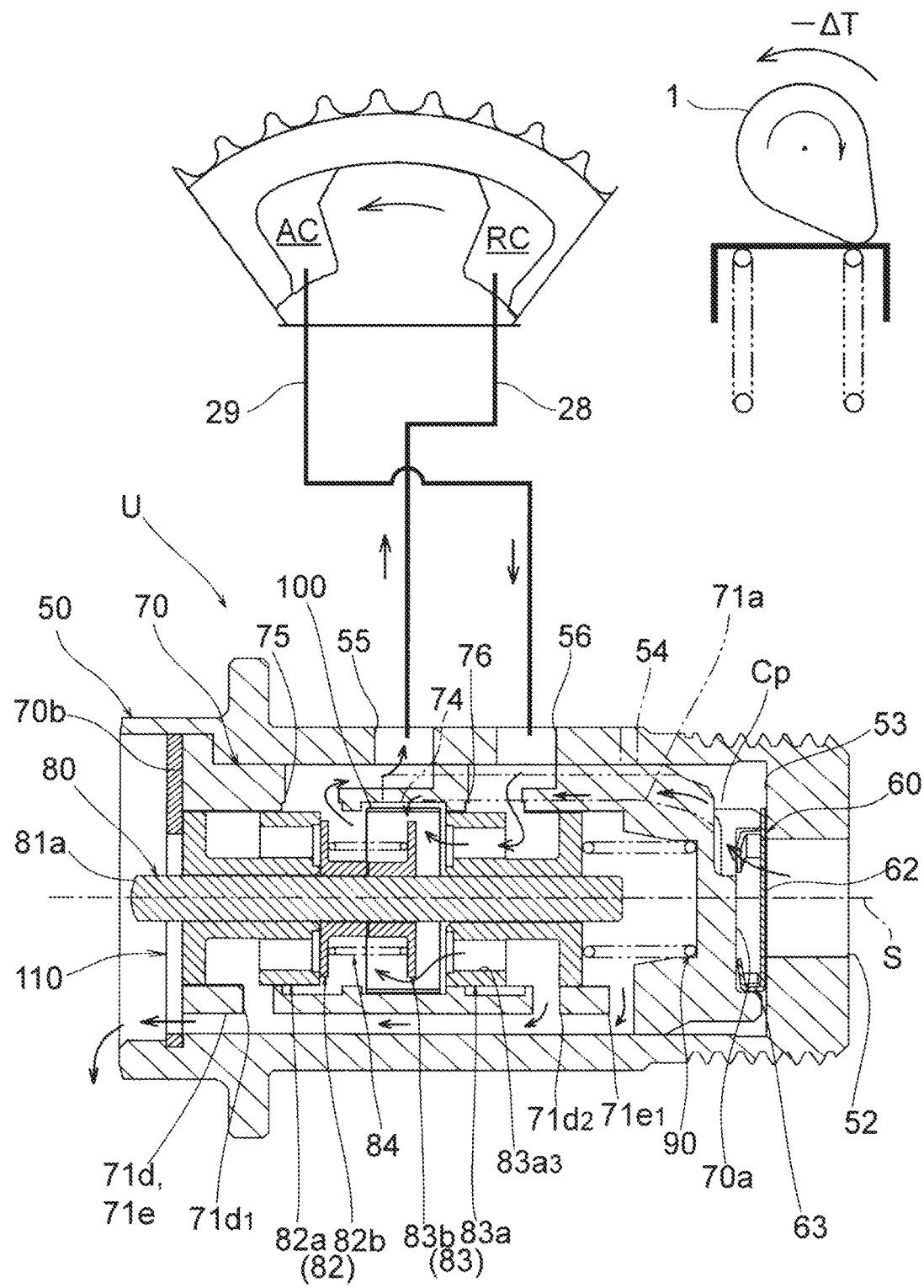
FIG. 24 is a schematic view illustrating a relationship between the spool of the fluid control valve, the retard port, the advance port, and a hydraulic oil flow in a retard chamber and an advance chamber when the camshaft receives a reverse torque in a retard mode.
Figure 25:
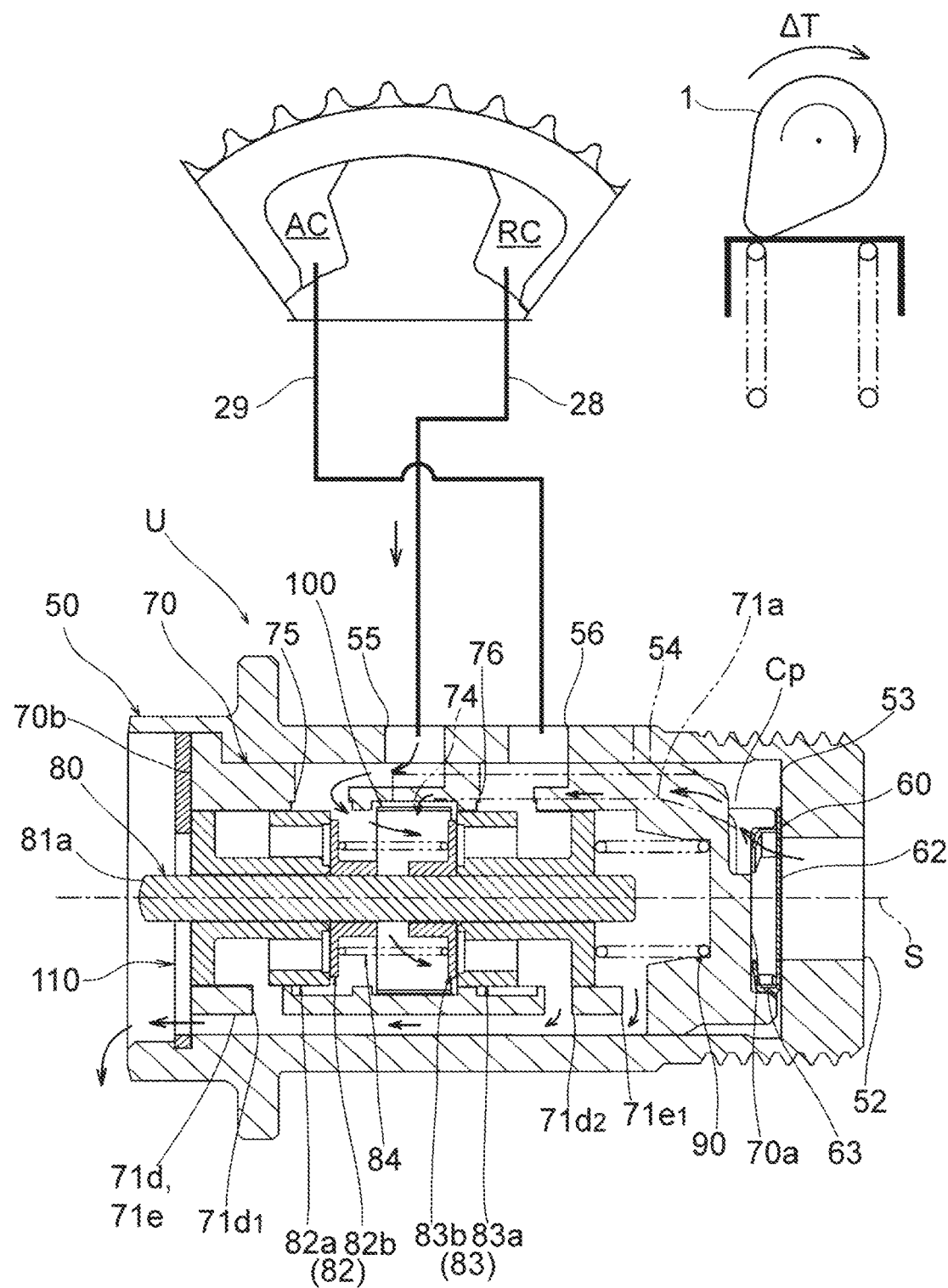
FIG. 25 is a schematic view illustrating a relationship between the spool of the fluid control valve, the retard port, the advance port, and the hydraulic oil flow in the retard chamber and the advance chamber when the camshaft receives a forward torque in the retard mode.

For example, as shown in FIGS. 24 and 25, in the case of the retard mode, the spool 80 is positioned at the inactive position due to the biasing force of the biasing spring 90.

In the retard mode, the first valve part 82 is set to the valve-open state in which the passage between the supply port 74 and the retard port 75 is opened, the second valve part 83 is set to the valve-closed state in which the passage between the supply port 74 and the advance port 76 is blocked. Specifically, the second land 83a1 of the second fixed part 83a opens the advance port 76 and the second cover part 83$b_2$ of the second movable part 83b blocks the second inner passage 83$a_3$. In addition, the discharge passage (the first communication path 71d and the through path 71$d_2$) is in a state of being able to communicate with the advance port 76 to discharge the hydraulic oil in the advance chamber AC.

In the state, when the camshaft 1 receives a reverse torque (−ΔT) with respect to the forward rotation direction CR, the hydraulic pressure of the hydraulic oil in the advance chamber AC increases. Therefore, as shown in FIG. 24, the hydraulic oil inside the advance chamber AC causes the second cover part 83$b_2$ of the second movable part 83b to be detached from the second fixed part 83a while resisting the biasing force of the compression spring 84. Accordingly, the second inner passage 83$a_3$ is opened and the hydraulic oil actively flows into the retard port 75 from the advance port 76. At this time, the hydraulic oil in an amount less than the hydraulic oil toward the retard port 75 is discharged from the discharge port (the notch part 110a, the circular hole 112a) of the snap ring 110 through the discharge passage (the through path 71d2 and the first communication path 71d and the communication concave part 71h). In addition, the hydraulic oil leaked to the region where the biasing spring 90 is disposed is appropriately discharged from the discharge ports (the notch part 110a, the circular hole 112b) of the snap ring 110 through the discharge passage (the through path 71$e_1$ and the second communication path 71e, and the communication concave part 71h).

Meanwhile, when the camshaft 1 receives a torque (ΔT) in a forward direction, the hydraulic pressure of the hydraulic oil in the retard chamber RC increases. However, as shown in FIG. 25, since the hydraulic oil in the retard chamber RC acts in a direction of bringing the second movable part 83b to abut against the second fixed part 83a, the second inner passage 83a3 is blocked, and the hydraulic oil from the retard port 75 toward the advance port 76 does not flow.

By continuously receiving the reverse torque (−ΔT) and the forward torque (ΔT), the hydraulic oil in the advance chamber AC moves into the retard chamber RC, and the vane rotor is positioned at the most retard position as shown in FIG. 22. In this process, in order to fill the hydraulic oil, the check valve 100 is opened appropriately and allows the hydraulic oil from the supply port 74 to flow in.

Figure 26:
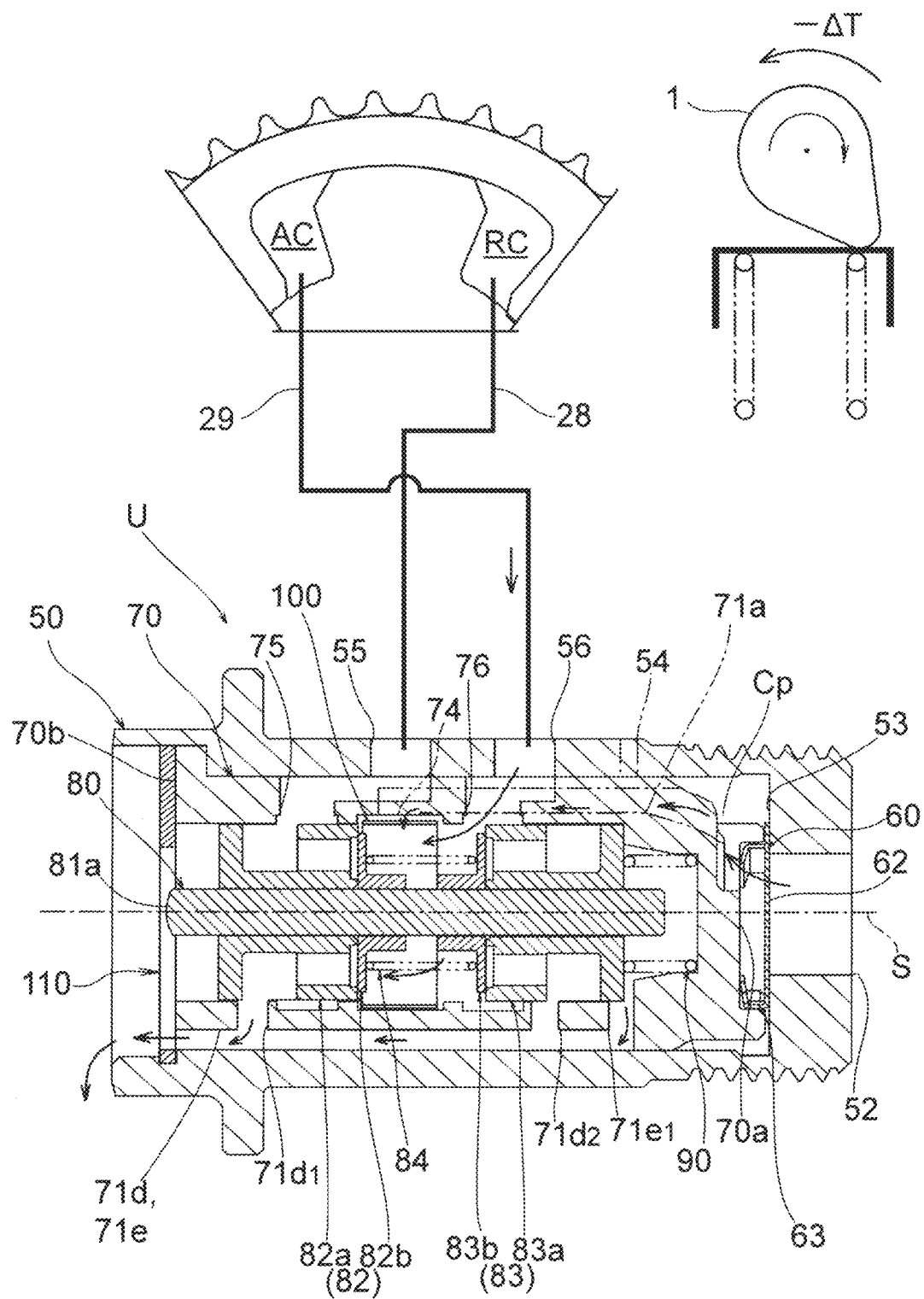
FIG. 26 is a schematic view illustrating a relationship between the spool of the fluid control valve, the retard port, the advance port, and the hydraulic oil flow in the retard chamber and the advance chamber when the camshaft receives a reverse torque in an advance mode.
Figure 27:
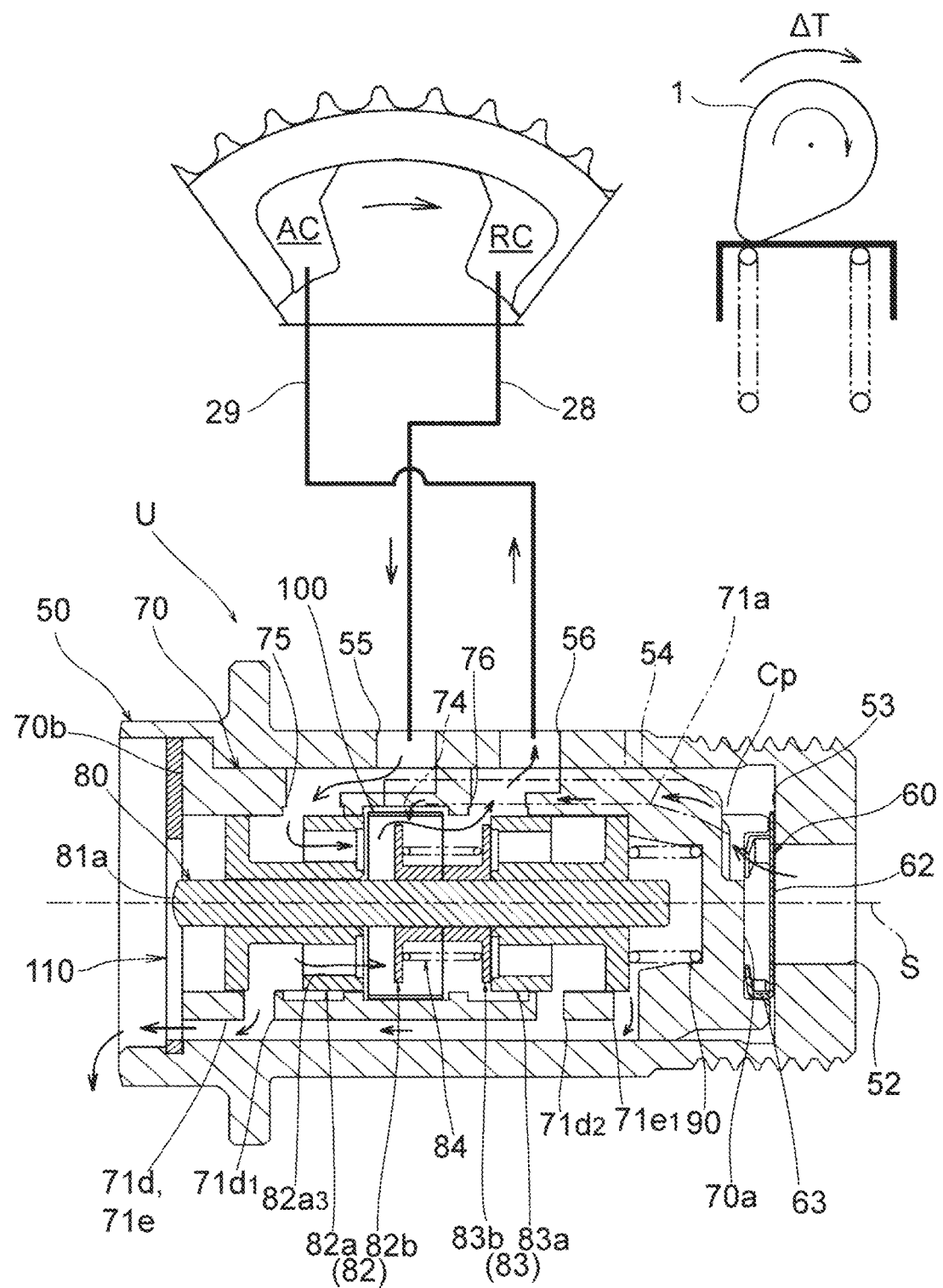
FIG. 27 is a schematic view illustrating a relationship between the spool of the fluid control valve, the retard port, the advance port, and the hydraulic oil flow in the retard chamber and the advance chamber when the camshaft receives a forward torque in the advance mode.

Then, in the case of the advance mode, as shown in FIGS. 26 and 27, the spool 80 resists the biasing force of the biasing spring 90 and is positioned to the innermost position in the direction of the axis S through the driving shaft 7a of the electromagnetic actuator 7.

In the advance mode, the second valve part 83 is set to the valve-open state in which the passage between the supply port 74 and the advance port 76 is opened, the first valve part 82 is set to the valve-closed state in which the path between the supply port 74 and the retard port 75 is blocked.

Specifically, the first land $82a_1$ of the first fixed part $82a$ opens the retard port 75 and the first cover part $82b_2$ of the first movable part $82b$ blocks the first inner passage $82a_3$. In addition, the discharge passage (the communication path $71d$ and the through path $71d_1$) is in a state of being able to communicate with the retard port 75 to discharge the hydraulic oil in the retard chamber RC.

In the state, when the camshaft 1 receives a reverse torque ($-\Delta T$) with respect to the forward rotation direction CR, the hydraulic pressure of the hydraulic oil in the advance chamber AC increases. However, as shown in FIG. 26, since the hydraulic oil in the advance chamber AC acts in a direction of bringing the first movable part $82b$ to abut against the first fixed part $82a$, the first inner passage $82a_3$ is blocked, and the hydraulic oil from the advance port 76 toward the retard port 75 does not flow.

Meanwhile, when the camshaft 1 receives a torque ($\Delta T$) in a forward direction, the hydraulic pressure of the hydraulic oil in the retard chamber RC increases. Therefore, as shown in FIG. 27, the hydraulic oil inside the retard chamber RC causes the first cover part $82b_2$ of the first movable part $82b$ to be detached from the first fixed part $82a$ while resisting the biasing force of the compression spring 84. Accordingly, the first inner passage $82a3$ is opened and the hydraulic oil actively flows from the retard port 75 toward the advance port 76. At this time, the hydraulic oil in an amount less than the hydraulic oil toward the advance port 76 is discharged from the discharge ports (the notch part $110a$, the circular hole $112a$) of the snap ring 110 through the discharge passage (the through path $71d_1$ and the first communication path $71d$ and the communication concave part $71h$). In addition, the hydraulic oil leaked to the region where the biasing spring 90 is disposed is appropriately discharged from the discharge ports (the notch part $110a$, the circular hole $112b$) of the snap ring 110 through the discharge passage (the through path $71e_1$ and the second communication path $71e$, and the communication concave part $71h$).

By continuously receiving the reverse torque ($-\Delta T$) and the forward torque ($\Delta T$), the hydraulic oil in the retard chamber RC moves into the advance chamber AC, and the vane rotor is positioned at the most advance position as shown in FIG. 23. In this process, in order to fill the hydraulic oil, the check valve 100 is opened appropriately and allows the hydraulic oil from the supply port 74 to flow in.

That is, the spool 80 of the fluid control valve V is formed so that, in the state of being positioned in the retard mode in which the first valve part 82 is opened and the second valve part 83 is closed, when the camshaft 1 receives the reverse torque ($-\Delta T$), the second valve part 83 is opened to allow the flow of the hydraulic oil from the advance port 76 toward the retard port 75, and in the state of being positioned at the advance mode in which the first valve part 82 is closed and the second valve part 83 is opened, when the camshaft 1 receives the forward torque ($\Delta T$), the first valve part 82 is opened to allow the flow of the hydraulic oil from the retard port 75 toward the advance port 76.

Although the series of operations are operations when the internal combustion engine is in the low-speed operation state, for example, when the internal combustion engine is in a high-speed operation state, the torque change ($\Delta T$, $-\Delta T$) applied by the camshaft 1 decreases, no reciprocation of the hydraulic oil in the retard chamber RC and the advance chamber AC is generated, and it is difficult to open/close the first valve part 82 and the second valve part 83 through the torque change.

As a result, through the opening of the check valve 100, the hydraulic oil supplied from the supply port 74 actively flows into the retard chamber RC or the advance chamber AC, whereas the hydraulic oil in the advance chamber AC or the retard chamber RC is actively discharged outside from the discharge port (the notch part $110a$, the circular hole $112a$) of the snap ring 110 through the discharge passage (the through path $71d_2$ or the through path $71d_1$ and the first communication path $71d$). In addition, the hydraulic oil leaked to the region where the biasing spring 90 is disposed is appropriately discharged from the discharge ports (the notch part $110a$, the circular hole $112b$) of the snap ring 110 through the discharge passage (the through path $71e_1$ and the second communication path $71e$, and the communication concave part $71h$).

Figure 28:
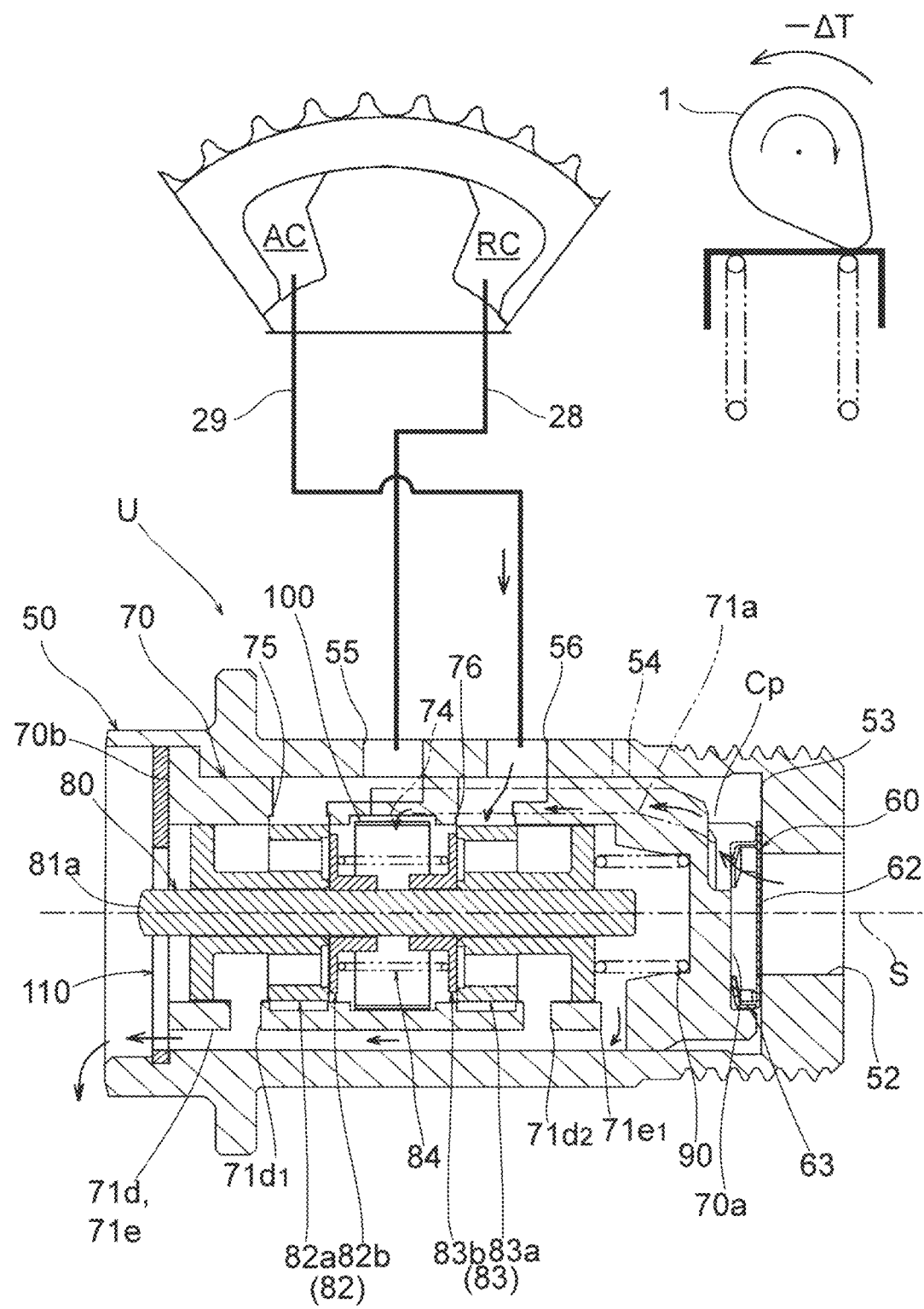
FIG. 28 is a schematic view illustrating a relationship between the spool of the fluid control valve, the retard port, the advance port, and the hydraulic oil flow in the retard chamber and the advance chamber when the camshaft receives a reverse torque in a neutral hold mode.
Figure 29:
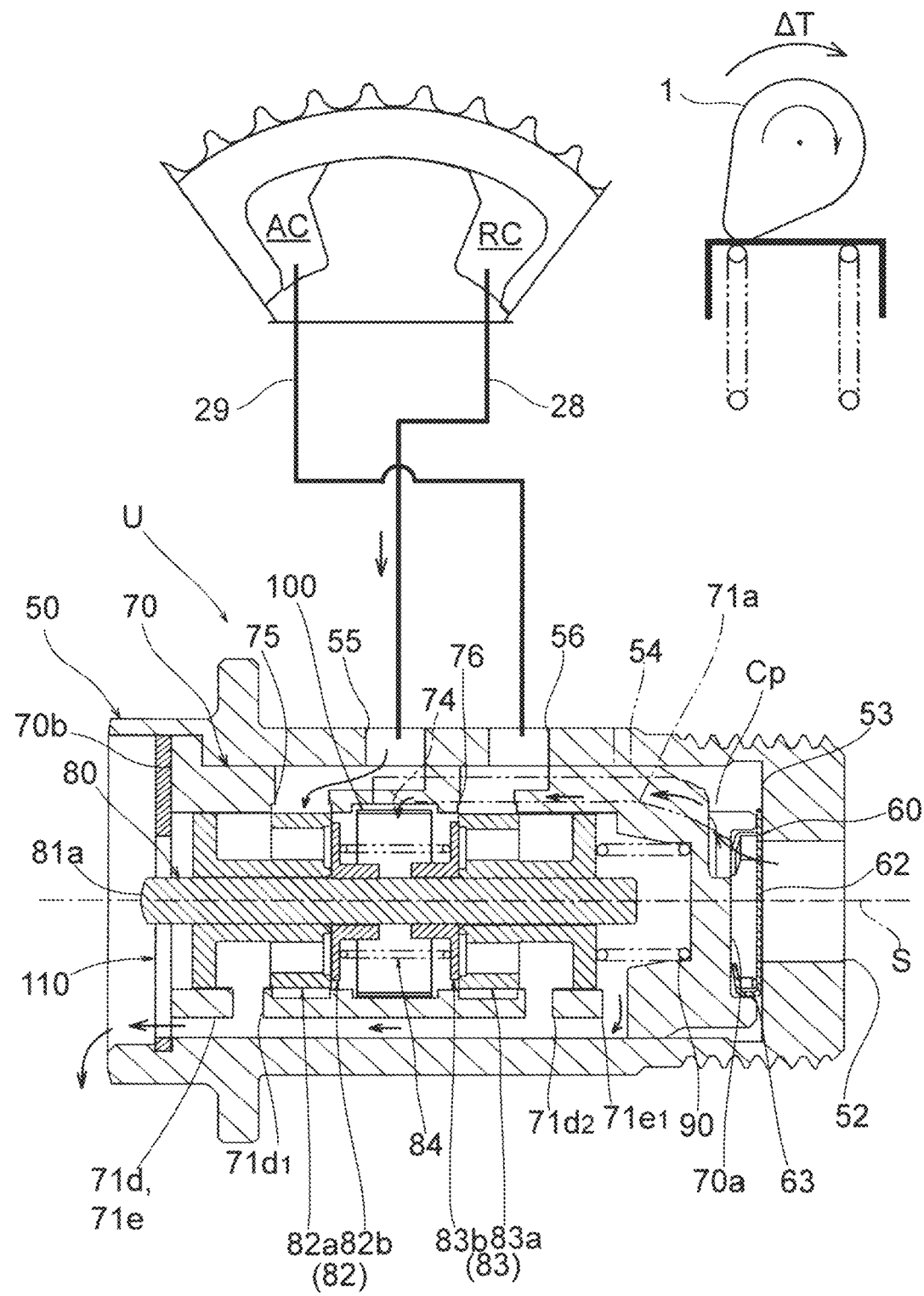
FIG. 29 is a schematic view illustrating a relationship between the spool of the fluid control valve, the retard port, the advance port, and the hydraulic oil flow in the retard chamber and the advance chamber when the camshaft receives a forward torque in the neutral hold mode.

Then, in the case of the neutral hold mode, as shown in FIGS. 28 and 29, the spool 80 resists the biasing force of the biasing spring 90 and is positioned to the intermediate position in the direction of the axis S through the driving shaft $7a$ of the electromagnetic actuator 7.

In the neutral hold mode, the first valve part 82 is set to the valve-closed state in which the passage between the supply port 74 and the retard port 75 is blocked, and the second valve part 83 is set to the valve-closed state in which the passage between the supply port 74 and the advance port 76 is blocked.

Specifically, the first valve part 82 is set to a state in which the first land $82a$ of the first fixed part $82a$ blocks the retard port 75 and the first cover part $82b_2$ of the first movable part $82b$ blocks the first inner passage $82a_3$. In addition, the second valve part 83 is set to a state in which the second land $83a_1$ of the second fixed part $83a$ blocks the advance port 76 and the second cover part $83b_2$ of the second movable part $83b$ blocks the second inner passage $83a_3$. In addition, the communication between the discharge passage (the communication path $71d$ and the through path $71d_1$) and the retard port 75 is cut off, and the communication between the discharge passage (the communication path $71d$ and the through path $71d_2$) and the advance port 76 is cut off.

In the state, when the camshaft 1 receives a reverse torque ($-\Delta T$) with respect to the forward rotation direction CR, the hydraulic pressure of the hydraulic oil in the advance chamber AC increases. However, as shown in FIG. 28, the advance port 76 is blocked by the second land $83a_1$ of the second valve part 83. Therefore, the hydraulic oil in the advance chamber AC stays in the advance chamber AC without being able to move from the advance port 76 toward the retard port 75.

Meanwhile, when the camshaft 1 receives a torque ($\Delta T$) in a forward direction, the hydraulic pressure of the hydraulic oil in the retard chamber RC increases. However, as shown in FIG. 29, the retard port 75 is blocked by the first land $82a1$ of the first valve part 82. Therefore, the hydraulic oil in the retard chamber RC stays in the retard chamber RC without being able to move from the retard port 75 toward the advance port 76.

As described above, in the neutral hold mode, the reciprocation of the hydraulic oil between the retard chamber RC and the advance chamber AC is cut off, and the discharge passage (the through path $71d_1$, $71d_2$) is also blocked. Therefore, the vane rotor 20 is held at a desired intermediate position between the most retard position and the most advance position with respect to the housing rotor 10.

That is, in the fluid control valve V, in the state of being positioned in the neutral hold mode in which the first valve part 82 blocks the retard port 75 and the second valve part 83 blocks the advance port 76, the spool 80 is formed to cut off the reciprocation of the hydraulic oil between the retard chamber RC and the advance chamber AC.

As described above, the fluid control valve V is a torque-driven and hydraulic pressure-driven type fluid control valve able to reciprocate the hydraulic oil between the retard chamber RC and the advance chamber AC and discharge a portion of the hydraulic oil that is supplied by using a variable torque received by the camshaft 1. Therefore, it is possible to change the opening/closing timing of the valve to a desired timing by reciprocating the hydraulic oil between the retard chamber RC and the advance chamber AC in an operation state (at the time of low-speed operation, etc.) in which a sufficient variable torque can be obtained and actively discharging the hydraulic oil in an operation state (e.g., at the time of high-speed operation) in which it is difficult to obtain a sufficient variable torque.

Figure 30:
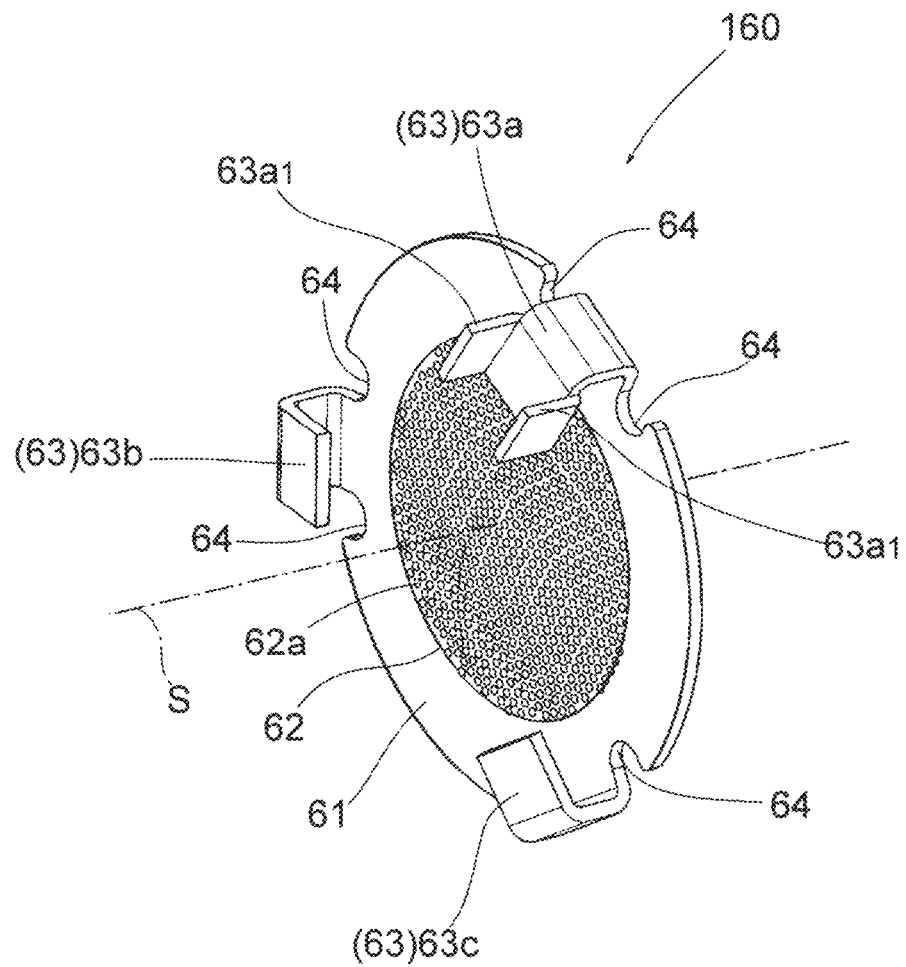
FIG. 30 is a perspective view illustrating another embodiment of a filter included in the fluid control valve unit according to the invention.

FIG. 30 illustrates another embodiment of the filter included in the fluid control valve unit U. The components same as those of the filter are labeled with the same symbols, and the description thereof is omitted.

As shown in FIG. 30, a filter 160 according to the embodiment includes the annular plate part 61, the filter part 62, the plate spring pieces 63 (the first plate spring piece 63a, the second plate spring piece 63b, the third plate spring piece 63c), and a pair of clamping pieces $63a_1$ integrally formed with the first plate spring piece 63a.

In addition, in the filter 160, in the state of being assembled to the bottom end 70a of the sleeve 70, the first plate spring piece 63a abuts against the narrow abutting part $70a_4$, the second plate spring piece 63b and the third plate spring piece 63c abut against the wide abutting part $70a_5$. In the assembled state, the pair of clamping pieces $63a_1$ are assembled to sandwich the narrow abutting part $70a_4$ from the two sides. Therefore, the filter 160 can be positioned at a predetermined angle about the axis S. Accordingly, the first plate spring piece 63a can be assembled to reliably abut against the narrow abutting part $70a_4$ without falling off from the narrow abutting part $70a_4$.

In the embodiments, configurations in which the filter 60, 160 includes three plate spring pieces (the first plate spring piece 63a, the second plate spring piece 63b, and the third plate spring piece 63c) as the plate spring pieces 63 are shown. However, the invention is not limited thereto. The plate spring pieces in other numbers may also be adopted.

In the embodiment, configurations in which, in the filter 60, 160, the annular plate part 61 abuts against the annular receiving part 53 of the passage member (the fastening bolt 50) and the plate spring pieces 63 abut against the bottom end 70a (the narrow abutting part $70a_4$, the wide abutting part $70a_5$) of the sleeve 70 are shown. However, if the sealing function can be ensured, on the contrary, a configuration in which the plate spring pieces 63 abut against the annular receiving part 53 of the passage member (the fastening bolt 50) and the annular plate part 61 abuts against the bottom end 70a of the sleeve 70 (the narrow abutting part $70a_4$, the wide abutting part $70a_5$) may also be adopted.

As an example, a configuration in which the portion serving for the seal function, such as the cylindrical part in the outer circumferential region of the annular plate part 61, is integrally provided with the filter, and an inner circumferential wall in close contact with the cylindrical member is provided continuously with the annular receiving part can be adopted, for example.

In the embodiments, the case where the lock mechanism 40 is locked at the intermediate position is shown. However, the invention is not limited thereto. The lock mechanism 40 may also be locked at the most retard position or other positions.

In the embodiments, as a rotational biasing spring that rotationally biases the vane rotor 20, the rotation biasing spring 30 applying a biasing force in the advance direction is shown. However, the invention is not limited thereto. On the contrary, a rotation biasing spring applying a biasing force in the opposite direction, i.e., the retard direction, may also be adopted.

In the embodiments, the torque-driven and hydraulic pressure-driven type fluid control valve V is shown as the fluid control valve. However, the invention is not limited thereto. A fluid control valve of other embodiments may also be adopted as long as such fluid control valve supplies and discharges the hydraulic oil.

In the embodiment, as the fluid control valve unit, the fluid control valve unit U in which the fluid control valve V is disposed on the inner side of the fastening bolt 50 as the passage member is shown. However, the invention is not limited thereto. The invention is applicable even to a configuration in which the fluid control valve V is disposed in another passage member or a cylinder block of an engine.

In the embodiments, the case of handling hydraulic oil as a fluid controlled by the fluid control unit is shown. However, the invention is not limited thereto. The invention is also applicable at the time of controlling the flow of other fluids.

As described above, the fluid control valve unit of the invention can simplify the structure, reduce the number of components, reduce the cost, and simplify the assembling process, and can prevent a foreign matter from entering, and hold the sleeve at a predetermined position to ensure functional reliability. Therefore, in addition to being applicable to an internal combustion engine mounted in the automobile, etc., the fluid control valve unit of the invention can also be used in an internal combustion engine mounted in a motorcycle, etc., or a machine or apparatus that controls the flow of other fluids.

What is claimed is:

1. A fluid control valve unit, comprising:
    a fluid control valve, comprising: a sleeve, having a bottomed cylindrical shape, having: an inlet; a communication port in communication with outside; a bottom end; and an opening end, and defining an axis; and a spool slidably disposed in the sleeve to open and close the communication port;
    a passage member, having a cylindrical shape and provided with: an inner circumferential surface, fit with the sleeve; a passage of a fluid, leading to the communication port; an annular receiving part, facing the bottom end in a direction of the axis; and an opening part formed in adjacency with the annular receiving part and allowing the fluid to flow in;
    a filter, disposed between the bottom end and the annular receiving part; and
    a stopper, receiving the opening end of the sleeve accommodated in the passage member,
    wherein the filter is integrally formed by a metal plate spring member to include an annular plate part, a filter part surrounded by the annular plate part, and a plate spring piece extending from the annular plate part and applying a biasing force in the direction of the axis.

2. The fluid control valve unit as claimed in claim 1, wherein the passage member has an annular groove adjacent to the opening end in the direction of the axis and recessed with respect to the inner circumferential surface, and the stopper is a snap ring fit into the annular groove to detachably receive the spool.

3. The fluid control valve unit as claimed in claim 2, wherein the snap ring has a discharge port able to discharge the fluid flowing through a discharge passage formed in the passage member.

4. The fluid control valve unit as claimed in claim 3, wherein the snap ring is formed in a plate shape expanding in a direction perpendicular to the axis.

5. The fluid control valve unit as claimed in claim 2, wherein the sleeve comprises, as the communication port, a first communication port and a second communication port located on two sides sandwiching the inlet in the direction of the axis, and
the spool comprises: a rod, reciprocating in the sleeve; a first valve part, provided at the rod to open and close a passage between the inlet and the first communication port; a second valve part, provided at the rod to open and close a passage between the inlet and the second communication port; and a biasing spring, applying a biasing force in a direction that brings the first valve part to abut against the snap ring.

6. The fluid control valve unit as claimed in claim 5, wherein the spool comprises a compression spring disposed between the first valve part and the second valve part,
the first valve part comprises: a first fixed part, having a first land able to block the first communication port and a first inner passage formed on an inner side of the first land, and being fixed to the rod; and a first movable part, having a first cover part opening and closing the first inner passage and movably supported along the rod,
the second valve part comprises: a second fixed part, having a second land able to block the second communication port and a second inner passage formed on an inner side of the second land, and being fixed to the rod; and a second movable part, having a second cover part opening and closing the second inner passage and movably supported along the rod, and
the compression spring is disposed to apply a biasing force to close the first cover part and close the second cover part.

7. A valve timing change device, changing an opening/closing timing of an intake air valve or an exhaust air valve driven by a camshaft, the valve timing change device comprising:
a housing rotor, rotating coaxially with the camshaft;
a vane rotor, cooperating with the housing rotor to define an advance chamber and a retard chamber and integrally rotating with the camshaft;
the fluid control valve unit as claimed in claim 5, configured to control supplying and discharging of hydraulic oil with respect to the advance chamber and the retard chamber,
wherein the inlet of the fluid control valve unit is a supply port to which the hydraulic oil is supplied,
the first communication port of the fluid control valve unit is a retard port in communication with the retard chamber, and
the second communication port of the fluid control valve unit is an advance port in communication with the advance chamber.

8. The valve timing change device as claimed in claim 7, comprising a fastening bolt fastening the vane rotor to the camshaft,
wherein the fastening bolt serves as the passage member of the fluid control valve unit.

9. The valve timing change device as claimed in claim 8, wherein the fluid control valve of the fluid control valve unit is a torque-driven and hydraulic pressure-driven type fluid control valve reciprocating the hydraulic oil between the retard chamber and the advance chamber by using a variable torque received by the camshaft and being able to discharge a portion of the hydraulic oil that is supplied.

10. The valve timing change device as claimed in claim 9, wherein the spool is formed so that in a state of being positioned in a retard mode in which the first valve part is opened and the second valve part is closed, when the camshaft receives a reverse torque, the second valve part is opened to allow a flow of the hydraulic oil from the advance port toward the retard port, and in a state of being positioned in an advance mode in which the first valve part is closed and the second valve part is opened, when the camshaft receives a forward torque, the first valve part is opened to allow a flow of the hydraulic oil from the retard port toward the advance port.

11. The valve timing change device as claimed in claim 10, wherein the spool is formed so that in a state of being positioned in a neutral hold mode in which the first valve part blocks the retard port and the second valve part blocks the advance port, reciprocation of the hydraulic oil between the retard chamber and the advance chamber is cut off.

12. The fluid control valve unit as claimed in claim 1, wherein the filter is disposed so that the annular plate part abuts against the annular receiving part, and the plate spring piece abuts against the bottom end.

13. The fluid control valve unit as claimed in claim 12, wherein the sleeve comprises, in a region of the bottom end, a cutout passage formed on an outer wall to supply the fluid passing through the filter to the inlet; and an abutting part abutting against the plate spring piece of the filter.

14. The fluid control valve unit as claimed in claim 13, wherein the cutout passage comprises a first cutout passage and a second cutout passage formed as separated from each other about the axis,
the abutting part comprises: a narrow abutting part located between the first cutout passage and the second cutout passage; and a wide abutting part away from the cutout passage, and
the plate spring piece comprises a first plate spring piece, a second plate spring piece, and a third plate spring piece disposed at equal intervals in a circumferential direction of the annular plate part.

15. The fluid control valve unit as claimed in claim 14, wherein the first plate spring piece comprises a pair of clamping pieces abutting against the narrow abutting part and sandwiching the narrow abutting part.

16. The fluid control valve unit as claimed in claim 1, wherein the filter part comprises a plurality of micro pores formed through an etching process.

17. The fluid control valve unit as claimed in claim 1, wherein the plate spring piece is formed to extend from an outer edge of the annular plate part and be bent.

18. The fluid control valve unit as claimed in claim 1, wherein the fluid control valve comprises a check valve disposed on an inner side of the sleeve to allow the fluid to flow in from the inlet.

* * * * *